(12) United States Patent
Steed et al.

(10) Patent No.: US 11,697,121 B2
(45) Date of Patent: Jul. 11, 2023

(54) WEAR LINER RETENTION DEVICES, AND RELATED ASSEMBLIES AND METHODS

(71) Applicants: Daniel J. Steed, Murray, UT (US); Shiloh D. Poulsen, Magna, UT (US); Jeremy Fairbourne, Syracuse, UT (US)

(72) Inventors: Daniel J. Steed, Murray, UT (US); Shiloh D. Poulsen, Magna, UT (US); Jeremy Fairbourne, Syracuse, UT (US)

(*) Notice: Subject to any disclaimer, the term of this patent is extended or adjusted under 35 U.S.C. 154(b) by 651 days.

(21) Appl. No.: 16/562,088

(22) Filed: Sep. 5, 2019

(65) Prior Publication Data

US 2021/0069720 A1 Mar. 11, 2021

(51) Int. Cl.
*B02C 17/22* (2006.01)
*H04W 4/80* (2018.01)
*B02C 17/18* (2006.01)

(52) U.S. Cl.
CPC ............... *B02C 17/22* (2013.01); *H04W 4/80* (2018.02); *B02C 17/1805* (2013.01); *B02C 2210/01* (2013.01)

(58) Field of Classification Search
CPC .......................... B02C 17/22; B02C 17/1855
See application file for complete search history.

(56) References Cited

U.S. PATENT DOCUMENTS

| | | | | |
|---|---|---|---|---|
| 3,350,832 A | * | 11/1967 | Persson | B02C 17/22 52/461 |
| 3,462,090 A | * | 8/1969 | Andrews | B02C 17/22 241/299 |
| 4,018,393 A | * | 4/1977 | Larsen | B02C 17/22 241/300 |
| 4,235,386 A | * | 11/1980 | Larsen | B02C 17/22 241/182 |
| 4,371,120 A | | 2/1983 | Grapin et al. | |
| 4,946,110 A | * | 8/1990 | Harris | B02C 17/22 241/300 |
| 5,176,053 A | | 1/1993 | Alvelid et al. | |

(Continued)

FOREIGN PATENT DOCUMENTS

| | | |
|---|---|---|
| GB | 2015099 A | 9/1979 |
| GB | 2255145 A | 10/1992 |

(Continued)

OTHER PUBLICATIONS

Bill Eccles, The use of two nuts to prevent self loosening, Nov. 2008 (Year: 2008).*

(Continued)

*Primary Examiner* — Faye Francis
(74) *Attorney, Agent, or Firm* — TraskBritt

(57) ABSTRACT

A wear liner retention device wear liner retention device comprises a shank structure, a nut structure, and an additional nut structure. The shank structure comprises a threaded region, an additional threaded, and an unthreaded region intervening between the threaded region and the additional threaded region. The nut structure is configured to threadably couple to the threaded region of the shank structure. The additional nut structure is configured to threadably couple to the additional threaded region of the shank structure. Related assemblies and methods are also described.

16 Claims, 5 Drawing Sheets

(56) References Cited

U.S. PATENT DOCUMENTS

| | | | |
|---|---|---|---|
| 6,082,646 A * | 7/2000 | Clarke | B02C 17/22 |
| | | | 241/300 |
| 6,208,128 B1 | 3/2001 | Braconnier et al. | |
| 7,113,125 B2 | 9/2006 | Le Sesne | |
| 7,172,144 B1 | 2/2007 | Slater et al. | |
| 7,677,079 B2 | 3/2010 | Radziszewski et al. | |
| 8,152,086 B2 | 4/2012 | Moeller et al. | |
| 8,384,266 B2 | 2/2013 | Fish et al. | |
| 8,544,782 B2 * | 10/2013 | Musschoot | B22D 31/007 |
| | | | 241/181 |
| 8,775,099 B2 | 7/2014 | Wagner et al. | |
| 9,415,395 B2 | 8/2016 | Fernandez | |
| 9,476,689 B2 | 10/2016 | Steed et al. | |
| 9,724,697 B2 | 8/2017 | Steed et al. | |
| 2003/0175090 A1 | 9/2003 | Port-Robach | |
| 2011/0037983 A1 | 2/2011 | Davies | |
| 2014/0319256 A1 * | 10/2014 | Knight | B02C 17/18 |
| | | | 241/182 |
| 2015/0028142 A1 * | 1/2015 | Coray | B02C 17/22 |
| | | | 241/300 |
| 2015/0362306 A1 | 12/2015 | Steed et al. | |
| 2016/0318028 A1 | 11/2016 | Clarke | |
| 2017/0003208 A1 * | 1/2017 | Steed | B02C 4/00 |
| 2017/0050769 A1 | 2/2017 | Steed et al. | |
| 2021/0132006 A1 * | 5/2021 | Vaidya | B02C 25/00 |

FOREIGN PATENT DOCUMENTS

| | | |
|---|---|---|
| JP | 2008-223311 A | 9/2008 |
| WO | 2005/083411 A1 | 9/2005 |
| WO | 2006/081610 A1 | 8/2006 |
| WO | 2007/128068 A1 | 11/2007 |

OTHER PUBLICATIONS

International Search Report from International Application No. PCT/US2020/070493, dated Nov. 13, 2020, 3 pages.

International Written Opinion from International Application No. PCT/US2020/070493, dated Nov. 13, 2020, 5 pages.

Global Business Report, "Chile Builds a Foundation for the Future," Engineering and Mining Journal, (Apr. 2014), pp. 91-103.

Kouche et al., "Ultrasonic Non-Destructive Testing (NDT) Using Wireless Sensor Networks", Procedia Computer Science, vol. 10, (2012), pp. 136-143.

Steel et al., "A Wireless Ultrasonic NDT Senor System," UKRCNDE, Center for Ultrasonic Engineering, 8 pages.

* cited by examiner

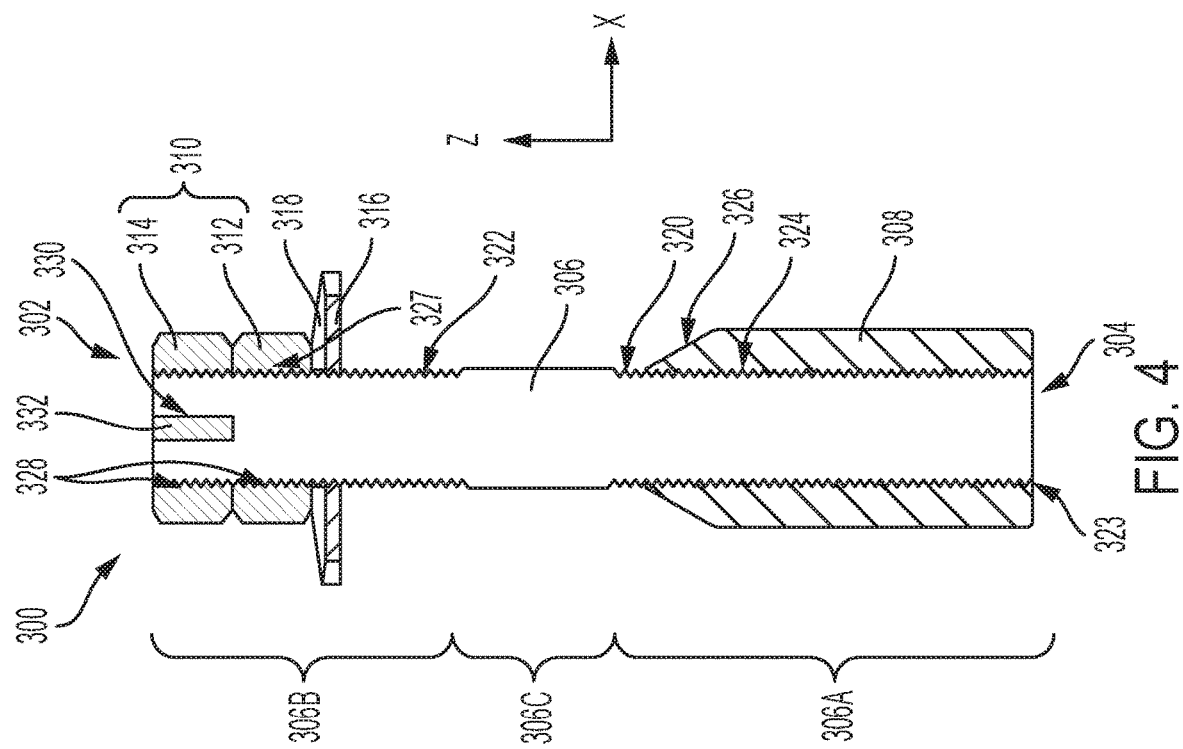
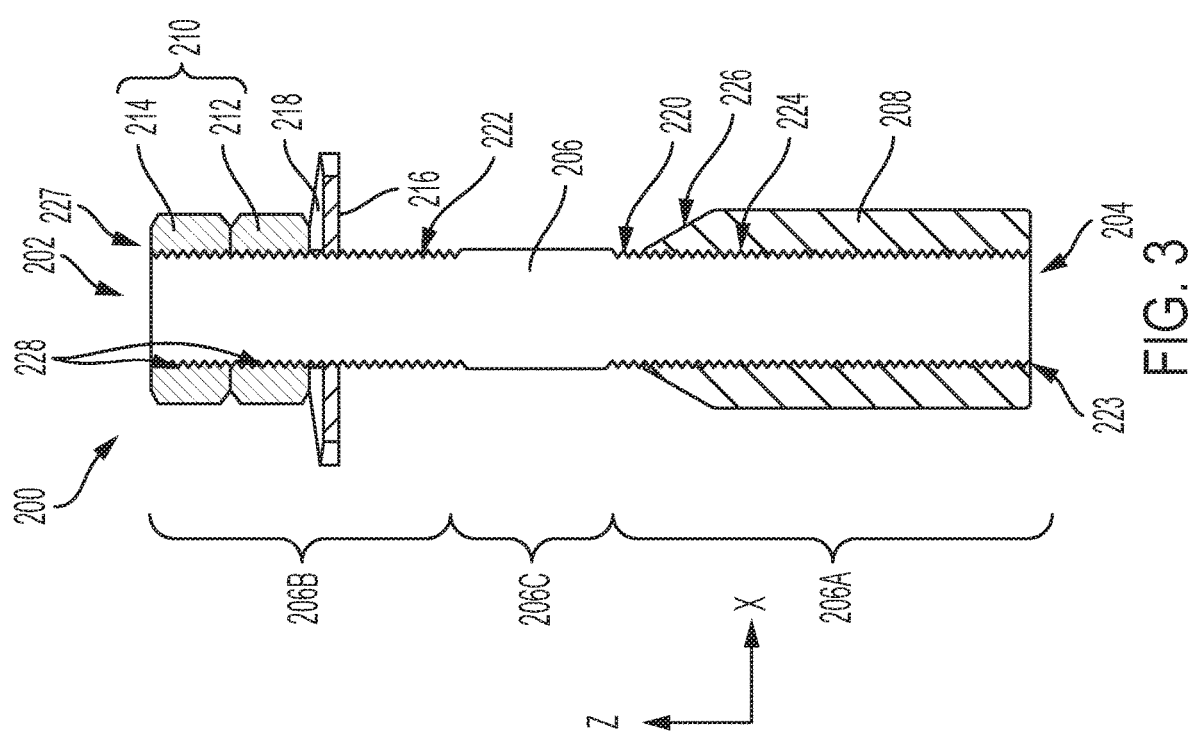
FIG. 3
FIG. 4

WEAR LINER RETENTION DEVICES, AND RELATED ASSEMBLIES AND METHODS

TECHNICAL FIELD

The disclosure, in various embodiments, relates generally to devices, assemblies, and methods for use in processing a mined material, such as ore. More particularly, embodiments of the disclosure relate to wear liner retention devices, and to related assemblies and methods.

BACKGROUND

The mining industry frequently utilizes mills (e.g., rotary mills, ball mills, rod mills, semiautogenous mills, autogenous mills) to reduce the size of masses of material structures (e.g., ore) mined from the earthen formations. During use and operation of a mill, mined structures (and, optionally, other structures, such as balls, rods) are typically lifted and dropped back onto other mined structures to form relatively smaller structures through the resulting impacts. The process can be continuous, with relatively large mined material structures being delivered into one end of the mill and relatively smaller material structures (e.g., particles) of the mined material exiting an opposite end of the mill.

Generally, internal surfaces of a mill are covered (e.g., lined) with wear liners (e.g., wear-resistant structures, such as wear-resistant plates) sized and shaped to prevent damage to the mill resulting from contact between the mined material structures (and, optionally, other structures) and the internal surfaces of the mill during use and operation of the mill. The mined material structures contact and degrade (e.g., wear, abrade) the wear liners rather than the internal surfaces of the mill. The wear liners may be detached and replaced upon exhibiting significant wear. Thus, the wear liners can prolong the durability and use of the mill.

Wear liners are typically coupled to internal surfaces of a shell of a mill by way of retaining bolts. A conventional retaining bolt includes a threaded rod region, and head region integral and continuous with the thread stud region and extending outwardly beyond a horizontal periphery of the threaded rod region. To attach a wear liner to the shell of a mill, the retaining bolt is inserted into aligned openings in the wear liner and the shell, such that the head region thereof engages the wear liner and the threaded rod region thereof extends through the wear liner and the shell of the mill. A nut is then threaded on a portion of the threaded rod region protruding past an external surface of the shell and tightened to secure the wear liner to the shell until the wear liner requires replacement. In other conventional arrangements, the retaining bolt is inserted into the aligned openings in the wear liner and the shell such that the head region thereof engages the shell of the mill and the threaded rod region thereof extends through the shell of the mill and the wear liner. The nut is then threaded on a portion of the threaded rod region protruding past an internal surface of the shell and tightened to secure the wear liner to the shell until the wear liner requires replacement.

Unfortunately, the configurations of conventional retaining bolts can create problems for milling operations. For example, conventional retaining bolts can be difficult to tighten to achieve a desirable clamping force, requiring the use of powerful, high speed torque tools (e.g., pneumatic torque wrenches). In addition, installing some conventional retaining bolts may expose installation personnel to increased risk of injury since at least one individual may be required to be inside of the mill for extended periods of time. For example, due to the configuration of some conventional retaining bolts, installation personnel may have to be present within the mill as the wear liner is positioned to align the openings to receive the retaining bolts and then install the retaining bolts within the aligned openings.

It would, therefore, be desirable to have retention devices, assemblies, and methods for milling operations that reduce, if not eliminate, at least some of the aforementioned problems.

BRIEF SUMMARY

Embodiments described herein include wear liner retention devices, and related assemblies and methods. For example, in accordance with one embodiment described herein, a wear liner retention device comprises a shank structure, a nut structure, and an additional nut structure. The shank structure comprises a threaded region, an additional threaded, and an unthreaded region intervening between the threaded region and the additional threaded region. The nut structure is configured to threadably couple to the threaded region of the shank structure. The additional nut structure is configured to threadably couple to the additional threaded region of the shank structure.

In additional embodiments, an assembly comprises a vessel comprising a shell a wear liner covering an internal surface of the shell of the vessel, and at least one retention device extending through and coupling the shell of the vessel and the wear liner. The at least one retention device comprises a shank structure, an inner nut structure, and an outer nut structure. The shank structure comprises a threaded region extending into an opening in the wear liner. The inner nut structure is within the opening in the wear liner and is threadably coupled to the threaded region of the shank structure. The outer nut structure overlies an exterior surface of the shell of the vessel and is threadably coupled to the additional threaded region of the shank structure.

In yet additional embodiments, a method comprises positioning a retention device within aligned openings extending through a shell of a vessel and a wear liner covering an internal surface of the shell. The retention device comprises a shank structure, an inner nut structure within the boundaries of the wear liner and threadably coupled to the threaded region of the shank structure, and an outer nut structure outside of the boundaries of the shell of the vessel and threadably coupled to the additional threaded region of the shank structure. The wear liner is clamped to the shell of the vessel using the retention device.

BRIEF DESCRIPTION OF THE DRAWINGS

FIG. 3 is a transverse cross-sectional view of a retention device, in accordance with an embodiment of the disclosure.

FIG. 4 is a transverse cross-sectional view of a retention device, in accordance with another embodiment of the disclosure.

DETAILED DESCRIPTION

Figure 1:
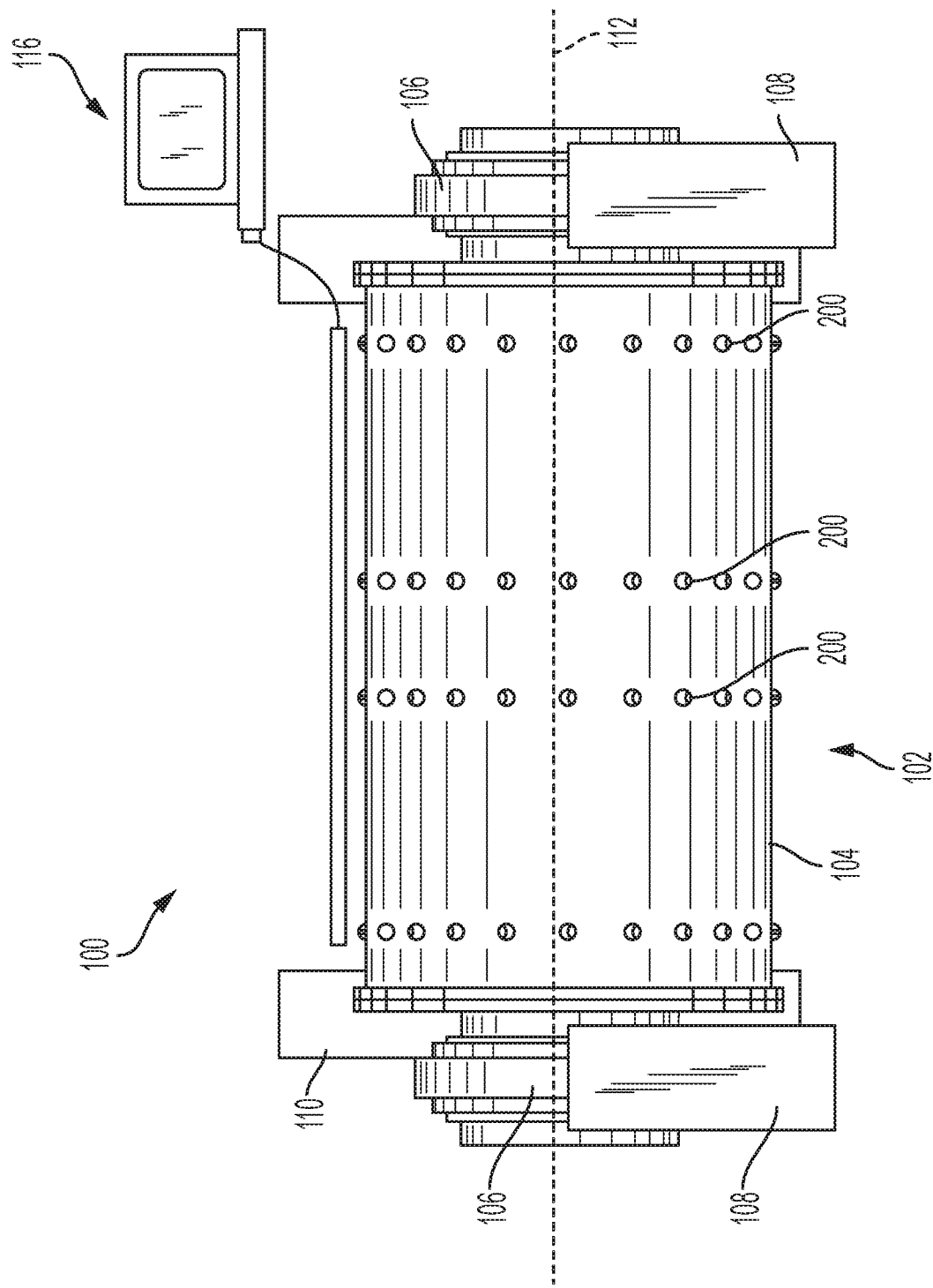
FIG. 1 is a simplified side elevation schematic view of an assembly, in accordance with an embodiment of the disclosure.

Wear liner retention devices are disclosed, as are related assemblies and methods. In some embodiments, a wear liner retention device includes a shank structure, an inner nut structure, and at least one outer nut structure. The shank structure includes a threaded region, an additional threaded region, and, optionally, an unthreaded region intervening between the threaded region and the additional threaded region. The inner nut structure is configured to be removably threadably coupled to the threaded region of the shank structure. The additional nut structure is configured to be removably threadably coupled to the additional threaded region of the shank structure. Optionally, the wear liner retention device may further include at least one opening at least partially (e.g., completely, less than completely) extending through the shank structure; and, optionally, at least one sensor within the at least one opening (if any). In addition, in some embodiments, an assembly includes one or more of the wear liner retention devices coupling at least one wear liner (e.g., at least one wear-resistant structure) to a shell of a vessel. Each of the wear liner retention devices may be substantially the same, or at least one of the wear liner retention devices may be different than at least one other of the wear liner retention devices. The wear liner retention devices, assemblies, and methods of the disclosure may provide enhanced efficiency, reduced costs, and increased safety relative to conventional devices, assemblies, and methods associated with milling operations.

In the following detailed description, reference is made to the accompanying drawings that depict, by way of illustration, specific embodiments in which the disclosure may be practiced. However, other embodiments may be utilized, and structural, logical, and configurational changes may be made without departing from the scope of the disclosure. The illustrations presented herein are not meant to be actual views of any particular material, component, apparatus, assembly, system, or method, but are merely idealized representations that are employed to describe embodiments of the disclosure. The drawings presented herein are not necessarily drawn to scale. Additionally, elements common between drawings may retain the same numerical designation.

Although some embodiments of the disclosure are depicted as being used and employed in particular assemblies and components thereof, persons of ordinary skill in the art will understand that the embodiments of the disclosure may be employed in any assembly and/or component thereof where it is desirable to enhance wear detection (e.g., sensing, indication) relating to the assembly and/or component thereof during use and operation. By way of non-limiting example, embodiments of the disclosure may be employed in any equipment associated with processing a mined material (e.g., ore) and subject to degradation (e.g., physical degradation and/or chemical degradation) including, but not limited to, rotary mills, ball mills, rod mills, semiautogenous (SAG) mills, autogenous (AG) mills, crushers, impactors, grinders, hoppers, bins, chutes, and other components associated with processing (e.g., grinding, crushing, pulverizing) a mined material, as known in the art.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "and" and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the terms "vertical," "vertically," "horizontal," and "horizontally" are in reference directions illustrated within the figures, and are not necessarily defined by earth's gravitational field. The terms "vertical" and "vertically" refer to the Z-direction depicted in some of the figures (e.g., in FIGS. 2 through 8), while the terms "horizontal" and "horizontally" refer to directions (e.g., the X-direction) perpendicular to the Z-direction.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "configured" refers to a size, shape, material composition, material distribution, orientation, and arrangement of one or more of at least one structure and at least one apparatus facilitating operation of one or more of the structure and the apparatus in a pre-determined way.

FIG. 1 is a simplified side elevation schematic view of an assembly 100, in accordance with an embodiment of the disclosure. The assembly 100 may be configured and operated to break down (e.g., grind, crush, pulverize) a mined material, such as ore. As shown in FIG. 1, the assembly 100 may include a vessel 102 (e.g., grinder, mill) including a shell 104. Bearings 106 and support structures 108 may be located at opposing ends of the vessel 102, and at least one rotation device 110 (motor, drive) may be positioned and configured to rotate the vessel 102 about an axis 112 thereof. Retention devices 200 (e.g., wear liner retention devices) extend into an internal chamber of the vessel 102. The retention devices 200 are configured and operated to attach (e.g., couple, bond, adhere) one or more components (e.g., wear-resistant structures) of the vessel 102 to at least one internal surface of the shell 104. Optionally, one or more of the retention devices 200 may also be configured and operated to obtain and communicate (e.g., relay, transmit, send, transfer) information related to the use and operation of the vessel 102, as described in further detail below. In addition, optionally, at least one receiving device 116 may be positioned and configured to receive information (if any) from one or more of the retention devices 200, and to communicate the information to one or more other devices configured and operated to analyze, display, and/or act upon the information, as also described in further detail below.

Figure 2:
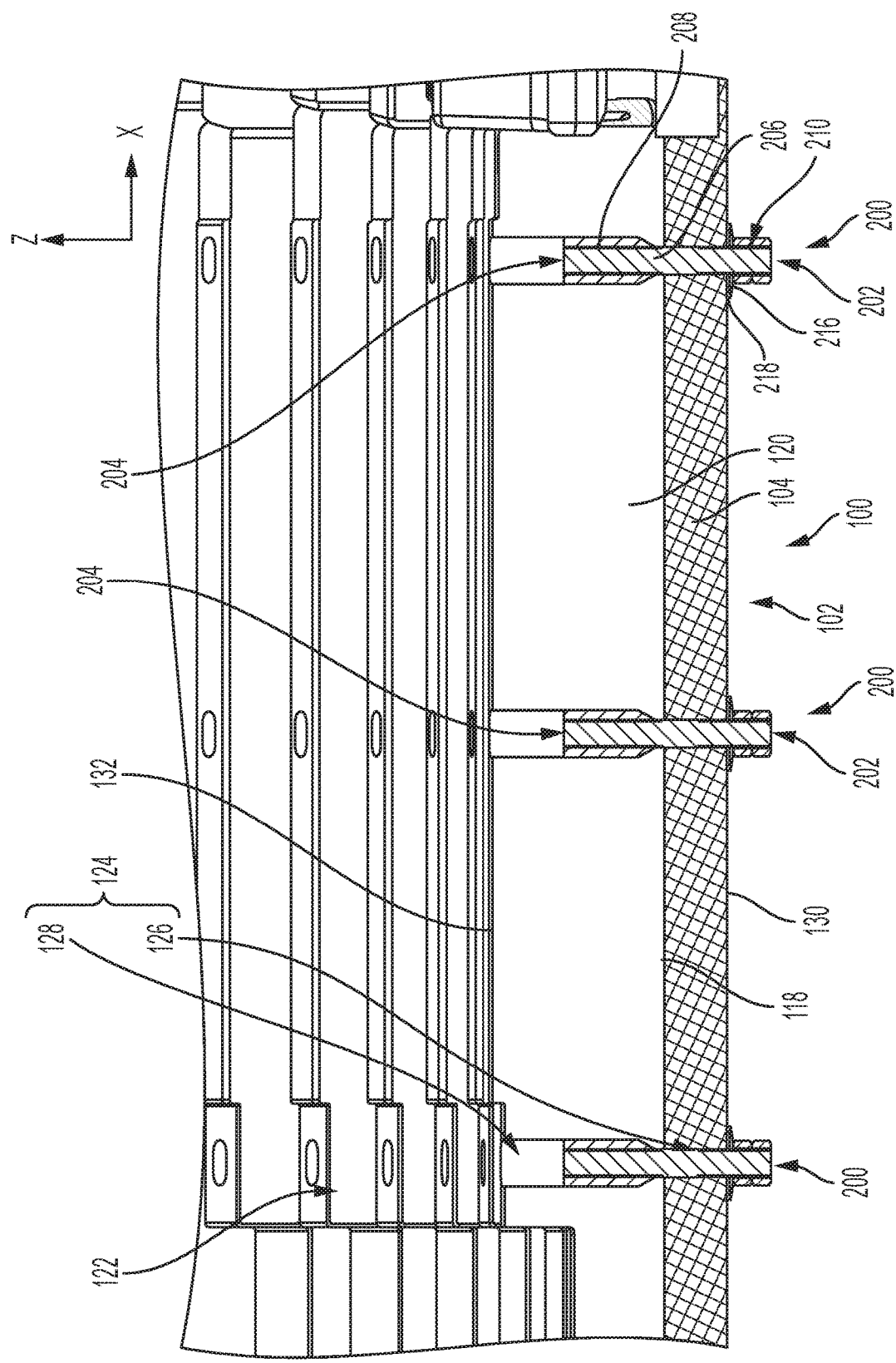
FIG. 2 is a partial, transverse cross-sectional view of a portion of the assembly depicted in FIG. 1, in accordance with an embodiment of the disclosure.

FIG. 2 is a partial cut-away perspective view of the vessel 102 depicted in FIG. 1 at a location proximate some of the retention devices 200 thereof. As shown in FIG. 2, at least one internal surface 118 of the shell 104 of the vessel 102 is covered (e.g., lined) with at least one wear liner 120 (e.g., at least one wear-resistant structure, such as at least one wear-resistant plate). The wear liner 120 may be formed of and include at least one material that is resistant to physical degradation (e.g., abrasion, erosion) and/or chemical degradation (e.g., corrosion). The wear liner 120 may have any geometric configuration (e.g., shape and size) sufficient to substantially protect the shell 104 of the vessel 102 from degradation. In some embodiments, the internal surface 118 of the shell 104 is covered with a plurality of wear liners 120 neighboring one another within an internal chamber 122 of the vessel 102, each of the plurality of wear liners 120 individually exhibiting a desired shape, size, and material composition.

The retention devices 200 may at least partially attach (e.g., couple, affix) the wear liner 120 to the internal surface 118 of the shell 104. The retention devices 200 may be positioned within aligned openings 124 of the shell 104 and the wear liner 120. The aligned openings 124 include first openings 126 extending completely through the shell 104 of the vessel 102, and second openings 128 aligned with the first openings 126 and extending completely through the wear liner 120. As shown in FIG. 2, the first openings 126 in the shell 104 of the vessel 102 may exhibit different geometric configurations (e.g., one or more different dimension(s), one or more different shape(s)) than the second openings 128 in the wear liner 120. Portions of the second openings 128 may, for example, exhibit larger horizontal cross-sectional areas than the first openings 126. As shown in FIG. 2, in some embodiments, portions of the second openings 128 relatively more distal (e.g., in the Z-direction) from the first openings 126 exhibit relatively larger horizontal cross-sectional areas, and other portions of the second openings 128 relatively more proximate (e.g., in the Z-direction) the first openings 126 exhibit relatively smaller horizontal cross-sectional areas. Outer horizontal cross-sectional boundaries of the second openings 128 may, for example, taper inward in a direction heading toward the of the first openings 126. In some embodiments, the outer boundaries of the second openings 128 taper inward at an angle within a range of from about 30 degrees to about 60 degrees (e.g., 30 degrees, 45 degrees, 60 degrees) relative to the internal surface 118 of the shell 104 of the vessel 102. In addition, the second openings 128 may exhibit substantially the same horizontal cross-sectional shape as the first openings 126, or may exhibit different horizontal cross-sectional shapes than the first openings 126. In some embodiments, the second openings 128 exhibit different horizontal cross-sectional shapes than the first openings 126. For example, the second openings 128 may exhibit a substantially oblong (e.g., horizontal cross-sectional shape) and the first openings 126 may exhibit a substantially circular horizontal cross-sectional shape. In additional embodiments, the first openings 126 and the second openings 128 exhibit substantially the same horizontal cross-sectional shapes as one another. For example, the first openings 126 and the second openings 128 may each exhibit a substantially circular horizontal cross-sectional shape. As described in further detail below, shapes (e.g., horizontal cross-sectional shapes) of the retention devices 200 (including shapes of different portions and components thereof) may be complementary to the shapes (e.g., horizontal cross-sectional shapes) of the aligned openings 124 (including the first openings 126 and the second openings 128 thereof) of the shell 104 and the wear liner 120.

As depicted in FIG. 2, a portion of a component (e.g., a shank structure 206) of each of the retention devices 200 may outwardly protrude beyond an external surface 130 of the shell 104, and may be threadably coupled to another component (e.g., at least one outer nut 210) of the retention device 200 overlying the external surface 130 of the shell 104. First vertical ends 202 (e.g., outermost boundaries in the Z-direction shown in FIG. 2) of the retention devices 200 may be outwardly vertically offset (e.g., in the Z-direction) from the external surface 130 of the shell 104. Moreover, an additional portion of the component (e.g., the shank structure 206) of each of the retention devices 200 may inwardly protrude beyond the internal surface 118 of the shell 104, and may be threadably coupled to a further component (e.g., an inner nut) of the retention device 200 within one of the second openings 128 in the wear liner 120. As shown in FIG. 2, in some embodiments, second vertical ends 204 (e.g., innermost boundaries in the Z-direction shown in FIG. 2) of the retention devices 200 opposing (e.g., in the Z-direction) the first vertical ends 202 of the retention devices 200 are recessed within the second openings 128 in the wear liner 120. The second vertical ends 204 of the retention devices 200 may be outwardly vertically offset (e.g., in the Z-direction) from inner surfaces 132 of the wear liner 120 (and innermost boundaries of the second openings 128). In additional embodiments, the second vertical ends 204 of the retention devices 200 are substantially coplanar with the inner surfaces 132 of the wear liner 120 (and innermost vertical boundaries of the second openings 128). Components of the retention devices 200 are described in further detail below.

FIG. 3 is a partial cross-sectional view of the retention device 200 depicted in FIG. 2. As shown in FIG. 3, the retention device 200 includes a shank structure 206 (e.g., a stud structure, a shaft structure), an inner nut structure 208, and at least one outer nut structure 210. The shank structure 206, the inner nut structure 208, and the outer nut structure 210 may be configured such that regions of the shank structure 206 may be received by and removably coupled (e.g., threadably coupled) to the inner nut structure 208 and the outer nut structure 210, as described in further detail below. In addition, the retention device 200 may further include at least one seal structure 216 (e.g., seal washer), and at least one cup structure 218 (e.g., cup washer). The seal structure 216 and the cup structure 218 may be configured such that the seal structure 216 may be received and removably contained within a recess in the cup structure 218. In addition, the seal structure 216 and the cup structure 218 may be configured to receive and horizontally surround one or more portions of the shank structure 206, as also described in further detail below. While FIG. 3 depicts a particular configuration of the retention device 200, one of ordinary skill in the art will appreciate that different retention device configurations are known in the art which may be adapted to be employed in embodiments of the disclosure. FIG. 3 illustrates just one non-limiting example of the retention device 200.

The shank structure 206 of the retention device 200 may be configured to be provided into (and received by) aligned openings 124 (FIG. 2) of the shell 104 (FIG. 2) and the wear liner 120 (FIG. 2) (including a first opening 126 (FIG. 2) within the shell 104 and a second opening 128 (FIG. 2) within the wear liner 120 aligned with the first opening 126), and to threadably engage each of the inner nut structure 208 and the outer nut structure 210. As described in further detail below, upon installation of the retention device 200, the combination of the shank structure 206, the inner nut structure 208, and the outer nut structure 210 of the retention device 200 may retain (e.g., hold, clamp) the wear liner 120 against the shell 104 of the vessel 102 (FIG. 2).

The shank structure 206 may exhibit a geometric configuration (e.g., dimensions, shape) permitting the shank structure 206 to be received by and threadably coupled to the inner nut structure 208 and the outer nut structure 210 of the retention device 200. In addition, the geometric configuration of the shank structure 206 may, in combination with a geometric configuration of the inner nut structure 208, form peripheral boundaries (e.g., outer boundaries) of the shank structure 206 and the inner nut structure 208 that complement peripheral boundaries of the aligned openings 124 (FIG. 2) of the shell 104 (FIG. 2) and the wear liner 120 (FIG. 2) (including peripheral boundaries of the first opening 126 (FIG. 2) in the shell 104 and the second opening 128 (FIG. 2) in the wear liner 120 aligned with the first opening 126) to receive the shank structure 206 and inner nut structure 208. For example, the shank structure 206 may exhibit a shape (e.g., a cylindrical column) complementary to a shape of openings in the inner nut structure 208 and the outer nut structure 210 of the retention device 200, as well as at least the first opening 126 (FIG. 2) in the shell 104 (FIG. 2) of the vessel 102 (FIG. 2) to receive the shank structure 206. In some embodiments, the shank structure 206 exhibits a cylindrical column shape. In addition, the shank structure 206 may exhibit a width (e.g., horizontal diameter) less than or equal to (e.g., slightly smaller than) widths (e.g., horizontal diameters) of the openings in the inner nut structure 208 and the outer nut structure 210, and a width (e.g., horizontal diameter) of first opening 126 (FIG. 2) in the shell 104 (FIG. 2); and a height (e.g., vertical dimension) less than or equal to (e.g., less than) a combined thickness of the shell 104 and the wear liner 120.

With continued reference to FIG. 3, in some embodiments, the shank structure 206 includes a threaded region 206A; an additional threaded region 206B, and an unthreaded region 206C between (e.g., vertically between) the threaded region 206A and the additional threaded region 206B. The threaded region 206A may exhibit non-planar sidewall(s) including protrusions 220 (e.g., threads, helical ridges) configured for coupling the shank structure 206 to the inner nut structure 208. The additional threaded region 206B may exhibit additional non-planar sidewall(s) including additional protrusions 222 (e.g., additional threads, additional helical ridges) configured for coupling the shank structure 206 to the outer nut structure 210. The unthreaded region 206C may exhibit substantially planar sidewall(s) free of protrusions (e.g., threads, helical ridges). The unthreaded region 206C the may serve to stop threading of the inner nut structure 208 and the outer nut structure 210 along the shank structure 206 after a predetermined amount of threadable engagement is achieved between the shank structure 206 and the inner nut structure 208 and the outer nut structure 210. Accordingly, the unthreaded region 206C may help control the relative positions of the shank structure 206, the inner nut structure 208, and the outer nut structure 210 during use and operation of the retention device 200 to ensure desirable amounts engagement between the shank structure 206 and each of the inner nut structure 208 and the outer nut structure 210, as well as desirable separation between inner nut structure 208 and the outer nut structure 210 and clamping force applied to the shell 104 (FIG. 2) and the wear liner 120 (FIG. 2) by the retention device 200.

The protrusions of the threaded region 206A of the shank structure 206 may exhibit substantially the same size, spacing, angle, and orientation (e.g., spiral direction) as the additional protrusions 222 of the additional threaded region 206B of the shank structure 206; or the protrusions 220 of the threaded region 206A of the shank structure 206 may exhibit one or more of a different size, different spacing, a different angle, and a different orientation (e.g., a different spiral direction) than the additional protrusions 222 of the additional threaded region 206B of the shank structure 206. In some embodiments, the protrusions 220 of the threaded region 206A of the shank structure 206 have substantially the same size, spacing, angle, and orientation as the additional protrusions 222 of the additional threaded region 206B of the shank structure 206.

The threaded region 206A, the additional threaded region 206B, and the unthreaded region 206C of the shank structure 206 may each individually have any desirable dimensions. The dimensions of the threaded region 206A, the additional threaded region 206B, and the unthreaded region 206C of the shank structure 206 may be selected at least partially based on the dimensions of the shell 104 (FIG. 2) and the wear liner 120 (FIG. 2) to utilize the retention device 200, as well as the dimensions of the aligned openings 124 (FIG. 2) (including first opening 126 (FIG. 2) in the shell 104, and the second opening 128 in the wear liner 120) to receive the retention device 200 and the dimensions of the inner nut structure 208 and the outer nut structure 210 of the retention device 200. As shown in FIG. 3, in some embodiments, a height (e.g., vertical dimension) of the unthreaded region 206C of the shank structure 206 is less than a height of each of the threaded region 206A and the additional threaded region 206B of the shank structure 206; and the height of the threaded region 206A is greater than the height the additional threaded region 206B. In additional embodiments, the height of the unthreaded region 206C is greater than or equal to the height of one or more (e.g., each) of the threaded region 206A and the additional threaded region 206B, and/or the height of the threaded region 206A is less than or equal to the height the additional threaded region 206B.

In additional embodiments, the unthreaded region 206C is omitted (e.g., absent) from the shank structure 206. The shank structure 206 may, for example, include substantially non-planar sidewall(s) including protrusions (e.g., threads, helical ridges) continuously extending from and between opposing vertical boundaries (e.g., opposing vertical ends) of the shank structure 206. By way of non-limiting example, the threaded region 206A (including the protrusions 220 thereof) of the shank structure 206 may extend from and the opposing vertical boundaries of the shank structure 206.

The shank structure 206 may be formed of and include any material capable of retaining the wear liner 120 (FIG. 2) against the internal surface 118 (FIG. 2) of the shell 104 (FIG. 2) of the vessel 102 (FIG. 2) during use and operation of the vessel 102. The shank structure 206 may, for example, be formed of and include at least one rigid material, such as a rigid material suitable for use in a milling environment. By way of non-limiting example, the shank structure 206 may be formed of and include one or more of a metal (e.g., tungsten (W), titanium (Ti), molybdenum (Mo), niobium (Nb), vanadium (V), hafnium (Hf), tantalum (Ta), chromium (Cr), zirconium (Zr), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), aluminum (Al)), a metal alloy (e.g., a Cu-based alloy, an Fe-based alloy, an Ni-based alloy, an Fe- and Ni-based alloy, a Co- and Ni-based alloy, an Fe- and Co-based alloy, a Co- and Ni- and Fe-based alloy, an Al-based alloy, a Cu-based alloy, a Mg-based alloy, a Ti-based alloy, a steel, a low-carbon steel, a stainless steel), a metal-containing material (e.g., a metal nitride, a metal silicide, a metal carbide, a metal oxide), a ceramic material (e.g., carbides, nitrides, oxides, and/or borides, such as carbides and borides of at least one of W, Ti, Mo, Nb, V, Hf, Ta, Cr, Zr, Al, and silicon (Si)), and a ceramic-metal composite material. In some embodiments, the shank structure 206 is formed of and includes a metal alloy (e.g., a steel alloy).

The shank structure 206 may include a substantially homogeneous distribution or a substantially heterogeneous distribution of the material thereof. As used herein, the term "homogeneous distribution" means amounts of a material do not vary throughout different portions (e.g., different horizontal portions and different vertical portions) of a structure. Conversely, as used herein, the term "heterogeneous distribution" means amounts of a material vary throughout different portions of a structure. Amounts of the material may vary stepwise (e.g., change abruptly), or may vary continuously (e.g., change progressively, such as linearly, parabolically) throughout different portions of the structure. In some embodiments, the shank structure 206 exhibits a substantially homogeneous distribution of rigid material. In additional embodiments, the shank structure 206 exhibits a substantially heterogeneous distribution of at least one rigid material.

As shown in FIG. 3, in some embodiments, the shank structure 206 is free of apertures (e.g., openings) at least partially vertically (e.g., in the Z-direction) extending therethrough. In additional embodiments, the shank structure 206 includes one or more apertures at least partially vertically extending therethrough, as described in further detail below. If present, the aperture(s) may hold (e.g., contain) one or more additional component(s) (e.g., material(s), structure(s), device(s)) of the retention device 200.

With continued reference to FIG. 3, the inner nut structure 208 of the retention device 200 is configured to removably couple to (e.g., threadably couple to) the shank structure 206 of the retention device 200. In addition, the inner nut structure 208 is also configured to be received within a second opening 128 (FIG. 2) in the wear liner 120 (FIG. 2) and to engage surfaces of the wear liner 120 defining the second opening 128 during use and operation of the retention device 200. Accordingly, the configuration of the inner nut structure 208 may at least partially depend on the configurations of the shank structure 206 and the second opening 128 (FIG. 2) in the wear liner 120 (FIG. 2).

The inner nut structure 208 may exhibit a peripheral shape complementary to the shape of the second opening 128 (FIG. 2) in the wear liner 120 (FIG. 2). The inner nut structure 208 may, for example, exhibit peripheral horizontal cross-sectional shape(s) substantially corresponding to (e.g., substantially the same as) peripheral horizontal cross-sectional shape(s) of the second opening 128 (FIG. 2) in the wear liner 120 (FIG. 2). By way of non-limiting example, the peripheral horizontal cross-sectional shape(s) of the inner nut structure 208 may comprise one or more of an oblong shape, an elliptical shape, a tear drop shape, a circular shape a semicircular shape, a tombstone shape, a crescent shape, a triangular shape, a rectangular shape, a kite shape, and an irregular shape. In some embodiments, the inner nut structure 208 exhibits one or more oblong peripheral horizontal cross-sectional shape(s). The inner nut structure 208 may exhibit a substantially consistent peripheral horizontal cross-sectional shape but variable (e.g., non-consistent, such as increasing and/or decreasing) peripheral horizontal cross-sectional dimensions throughout the vertical height thereof; may exhibit substantially consistent a substantially consistent peripheral horizontal cross-sectional shape and substantially consistent peripheral horizontal cross-sectional dimensions throughout the vertical height thereof; or may exhibiting a variable peripheral horizontal cross-sectional shape and variable peripheral horizontal cross-sectional dimensions throughout the vertical height thereof. As shown in FIG. 3, in some embodiments, the inner nut structure 208 has variable peripheral horizontal cross-sectional shapes and variable peripheral horizontal cross-sectional dimensions. For example, the inner nut structure 208 may gradually transition from regions (e.g., regions to be relatively more distal from the shell 104 (FIG. 2) of the vessel 102 (FIG. 2)) exhibiting relatively more oblong peripheral horizontal cross-sectional shapes and relatively larger peripheral horizontal cross-sectional dimensions to additional regions (e.g., additional regions to be relatively more proximate the shell 104 (FIG. 2) of the vessel 102 (FIG. 2)) exhibiting relatively more circular peripheral horizontal cross-sectional shapes and relatively smaller peripheral horizontal cross-sectional dimensions. In some embodiments, one or more regions 226 of the inner nut structure 208 taper inward at an angle within a range of from about 30 degrees to about 60 degrees (e.g., 30 degrees, 45 degrees, 60 degrees) relative to a central vertical axis of the inner nut structure 208.

In addition, the inner nut structure 208 may exhibit peripheral dimensions less than peripheral dimensions of the second opening 128 (FIG. 2) in the wear liner 120 (FIG. 2) to receive the inner nut structure 208. For example, the inner nut structure 208 may exhibit peripheral horizontal cross-sectional dimensions less than (e.g., slightly less than) the peripheral horizontal cross-sectional dimensions of the second opening 128 (FIG. 2) in the wear liner 120 (FIG. 2) to receive the inner nut structure 208; and peripheral vertical cross-sectional dimensions (e.g., heights) of the inner nut structure 208 may be less than or equal to peripheral vertical cross-sectional dimensions of the second opening 128 (FIG. 2) in the wear liner 120 (FIG. 2). In some embodiments, the maximum vertical height of the inner nut structure 208 is less than or equal to the vertical height of the threaded region 206A of the shank structure 206 of the retention device 200. In additional embodiments, the maximum vertical height of the inner nut structure 208 is greater than the vertical height of the threaded region 206A of the shank structure 206 of the retention device 200.

The inner nut structure 208 may also exhibit at least one aperture 223 (e.g., bore, via, opening) at least partially vertically extending (e.g., in the Z-direction) therethrough. As depicted in FIG. 3, in some embodiments, the aperture 223 vertically extends completely through the inner nut structure 208. In additional embodiments, the aperture 223 vertically extends less than completely (e.g., partially) through the inner nut structure 208. The aperture 223 may exhibit a shape complementary to a shape of the region(s) (e.g., threaded region 206A) of the shank structure 206 to be received by and removably coupled (e.g., threadably coupled) to the inner nut structure 208. In some embodiments, the aperture 223 exhibits a cylindrical column shape complementary to a cylindrical column shape of the threaded region 206A of the shank structure 206.

As shown in FIG. 3, inner nut structure 208 includes other protrusions 224 (e.g., other threads, other helical ridges) projecting into the aperture 223 vertically extending therethrough. The other protrusions 224 may extend from and between opposing vertical boundaries (e.g., opposing vertical ends) of the aperture 223. The other protrusions 224 of the inner nut structure 208 may be configured (e.g., sized, shaped, spaced, oriented) to engage and couple with the protrusions 220 of the threaded region 206A of the shank structure 206 of the retention device 200. The engagement of the other protrusions 224 of the inner nut structure 208 with the protrusions 220 of the threaded region 206A of the shank structure 206 may permit the shank structure 206 to move vertically downward and/or vertically upward within the aperture 223 upon being rotated in one or more directions, or vice versa. For example, rotating the shank structure 206 clockwise may move the shank structure 206 vertically deeper into the inner nut structure 208, and rotating the shank structure 206 counter-clockwise may move the shank structure 206 from relatively vertically deeper portions of the inner nut structure 208 to relatively vertically shallower portions of the inner nut structure 208.

The inner nut structure 208 may be formed of and include any material capable of retaining the wear liner 120 (FIG. 2) against the internal surface 118 (FIG. 2) of the shell 104 (FIG. 2) of the vessel 102 (FIG. 2) during use and operation of the vessel 102. The inner nut structure 208 may, for example, be formed of and include at least one rigid material, such as a rigid material suitable for use in a milling environment. By way of non-limiting example, the inner nut structure 208 may be formed of and include one or more of a metal (e.g., W, Ti, Mo, Nb, V, Hf, Ta, Cr, Fe, Ru, Os, Co, Rh, Ir, Ni, Pd, Pt, Cu, Ag, Au, Al), a metal alloy (e.g., a Cu-based alloy, an Fe-based alloy, an Ni-based alloy, an Fe- and Ni-based alloy, a Co- and Ni-based alloy, an Fe- and Co-based alloy, a Co- and Ni- and Fe-based alloy, an Al-based alloy, a Cu-based alloy, a Mg-based alloy, a Ti-based alloy, a steel, a low-carbon steel, a stainless steel), a metal-containing material (e.g., a metal nitride, a metal silicide, a metal carbide, a metal oxide), a ceramic material (e.g., carbides, nitrides, oxides, and/or borides, such as carbides and borides of at least one of W, Ti, Mo, Nb, V, Hf, Ta, Cr, Zr, Al, and silicon (Si)), and a ceramic-metal composite material. The material composition of the inner nut structure 208 may be substantially the same as the material composition of the shank structure 206, or may be different than the material composition of the shank structure 206. In some embodiments, the inner nut structure 208 is formed of and includes a metal alloy (e.g., a steel alloy).

With continued reference to FIG. 3, the least one outer nut structure 210 of the retention device 200 is configured to removably couple to (e.g., threadably couple to) the shank structure 206 of the retention device 200. In addition, the outer nut structure 210 is also configured to overlie the external surface 130 (FIG. 2) of the shell 104 (FIG. 2) of the vessel 102 (FIG. 2) and engage the cup structure 218 of the retention device 200 during use and operation of the retention device 200. Accordingly, the configuration of the outer nut structure 210 may at least partially depend on the configurations of the shank structure 206 and cup structure 218.

As shown in FIG. 3, in some embodiments, the retention device 200 includes multiple (e.g., more than one) outer nut structures 210. The outer nut structures 210 may, for example, include a first outer nut structure 212 and a second outer nut structure 214. During use and operation of the retention device 200, the first outer nut structure 212 may vertically intervene between the cup structure 218 and the second outer nut structure 214. The first outer nut structure 212 may serve an outer tightening nut for the retention device 200, and the second outer nut structure 214 may serve as a jam nut (e.g., a check nut) for the retention device 200. In additional embodiments, the retention device 200 includes a single (e.g., only one) outer nut structure 210. For example, the second outer nut structure 214 may be omitted (e.g., absent) from the retention device 200.

The outer nut structure 210 may exhibit any peripheral geometric configurations (e.g., peripheral shapes, peripheral sizes) compatible with the geometric configurations of the shank structure 206 and the cup structure 218. In addition, the outer nut structure 210 may exhibit at least one bore 227 (e.g., aperture, via, opening) at least partially vertically extending (e.g., in the Z-direction) therethrough. As depicted in FIG. 3, in some embodiments, the bore 227 vertically extends completely through the outer nut structure 210. In additional embodiments, the bore 227 vertically extends less than completely (e.g., partially) through the outer nut structure 210.

As shown in FIG. 3, outer nut structure 210 include further protrusions 228 (e.g., further threads, further helical ridges) projecting into the bore 227 vertically extending therethrough. The further protrusions 228 may extend from and between opposing vertical boundaries (e.g., opposing vertical ends) of the bore 227. The further protrusions 228 of the outer nut structure 210 may be configured (e.g., sized, shaped, spaced, oriented) to engage and couple with the additional protrusions 222 of the additional threaded region 206B of the shank structure 206 of the retention device 200. The engagement of the further protrusions 228 of the outer nut structure 210 with the additional protrusions 222 of the additional threaded region 206B of the shank structure 206 may permit the shank structure 206 to move vertically downward and/or vertically upward within the bore 227 upon being rotated in one or more directions, or vice versa. For example, rotating the outer nut structure 210 clockwise may move the outer nut structure 210 vertically deeper along the shank structure 206, and rotating the outer nut structure 210 counter-clockwise may move the outer nut structure 210 from relatively vertically deeper portions along the shank structure 206 to relatively vertically shallower portions along the shank structure 206. However, it the outer nut structure 210 includes the first outer nut structure 212 and the second outer nut structure 214, attempting to rotate the first outer nut structure 212 counter-clockwise without also rotating the second outer nut structure 214 counter-clockwise may impede or prevent the movement of the first outer nut structure 212. Attempting to rotate the first outer nut structure 212 counter-clockwise without also rotating the second outer nut structure 214 may, instead, result in the counter-clockwise rotation of the shank structure 206, which may impact the engagement of the shank structure 206 with the inner nut structure 208, as described in further detail below.

The outer nut structure 210 may be formed of and include any material capable of retaining the wear liner 120 (FIG. 2) against the internal surface 118 (FIG. 2) of the shell 104 (FIG. 2) of the vessel 102 (FIG. 2) during use and operation of the vessel 102. The outer nut structure 210 may, for example, be formed of and include at least one rigid material, such as a rigid material suitable for use in a milling environment. By way of non-limiting example, the outer nut structure 210 may be formed of and include one or more of a metal (e.g., W, Ti, Mo, Nb, V, Hf, Ta, Cr, Zr, Fe, Ru, Os, Co, Rh, Ir, Ni, Pd, Pt, Cu, Ag, Au, Al), a metal alloy (e.g., a Cu-based alloy, an Fe-based alloy, an Ni-based alloy, an Fe- and Ni-based alloy, a Co- and Ni-based alloy, an Fe- and Co-based alloy, a Co- and Ni- and Fe-based alloy, an Al-based alloy, a Cu-based alloy, a Mg-based alloy, a Ti-based alloy, a steel, a low-carbon steel, a stainless steel), a metal-containing material (e.g., a metal nitride, a metal silicide, a metal carbide, a metal oxide), a ceramic material (e.g., carbides, nitrides, oxides, and/or borides, such as carbides and borides of at least one of W, Ti, Mo, Nb, V, Hf, Ta, Cr, Zr, Al, and silicon (Si)), and a ceramic-metal composite material. The material composition of the outer nut structure 210 may be substantially the same as the material compositions of the shank structure 206 and the inner nut structure 208, or may be different than the material composition one or more (e.g., each) of the shank structure 206 and the inner nut structure 208. In some embodiments, the outer nut structure 210 is formed of and includes a metal alloy (e.g., a steel alloy).

The seal structure 216 (e.g., seal washer) of the retention device 200 may be configured relative to the shank structure 206 and the cup structure 218 substantially completely seal the first opening 126 (FIG. 2) in the shell 104 (FIG. 2) of the vessel 102 (FIG. 2) in which the retention device 200 is to be employed. The seal structure 216 may, for example, be configured and positioned to seal against the external surface 130 (FIG. 2) of the shell 104, the shank structure 206, and the cup structure 218 during use and operation of the retention device 200 to prevent one or more materials (e.g., fluids, solid particles) from exiting from the vessel 102 through the first opening 126 in the shell 104. The configuration and position of the seal structure 216 may account for differences between the width (e.g., diameter) of the shank structure 206 and the width of the first opening 126 in the shell 104 to receive the shank structure 206 so as to substantially limit or even prevent material from flowing through the first opening 126 (e.g., through space between a sidewall of the shank structure 206 and a sidewall of first opening 126) during use and operation of the vessel 102. By way of non-limiting example, the seal structure 216 may comprise an annular (e.g., ring-shaped) structure sized and positioned to surround a horizontal periphery of the shank structure 206.

The seal structure 216 may be formed of and include at least one deformable material, such as a deformable material suitable for use in a milling environment. By way of non-limiting example, seal structure 216 may be formed of and include a solid polymeric material (e.g., a solid elastomeric material) exhibiting rubbery elastic extensibility and restoring properties. The solid polymeric material may exhibit properties (e.g., elastic modulus, bulk modulus, shear modulus, thermal resistance, tensile strength, hardness, abrasion resistance, chemical resistance, extrusion resistance, elongation) favorable to the use of the seal structure 216 (and, hence, the retention device 200) in hostile environmental conditions (e.g., high temperatures, high pressures, corrosive conditions, abrasive conditions), such as the environmental conditions present in various milling applications. In some embodiments, the seal structure 216 is formed of and includes a solid rubber material (e.g., silicone rubber, butyl rubber, polyurethane rubber, ethylene propylene diene monomer rubber, polyisoprene rubber, natural rubber).

The cup structure 218 (e.g., cup washer) of the retention device 200 is configured to surround a horizontal periphery of the shank structure 206, and to surround upper surface(s) and side surface(s) of the seal structure 216. The cup structure 218 may be configured to receive the seal structure 216 within a recess therein, and to press the seal structure 216 against the external surface 130 (FIG. 2) of the shell 104 (FIG. 2) of the vessel 102 (FIG. 2) during use and operation of the retention device 200. Accordingly, the configuration of the cup structure 218 may at least partially depend on the configurations of the shank structure 206 and the seal structure 216.

The cup structure 218 may be formed of and include any material capable of pressing the seal structure 216 against the external surface 130 (FIG. 2) of the shell 104 (FIG. 2) of the vessel 102 (FIG. 2) during use and operation of the vessel 102. The cup structure 218 may, for example, be formed of and include at least one rigid material, such as a rigid material suitable for use in a milling environment. By way of non-limiting example, the cup structure 218 may be formed of and include one or more of a metal (e.g., W, Ti, Mo, Nb, V, Hf, Ta, Cr, Zr, Fe, Ru, Os, Co, Rh, Ir, Ni, Pd, Pt, Cu, Ag, Au, Al), a metal alloy (e.g., a Cu-based alloy, an Fe-based alloy, an Ni-based alloy, an Fe- and Ni-based alloy, a Co- and Ni-based alloy, an Fe- and Co-based alloy, a Co- and Ni- and Fe-based alloy, an Al-based alloy, a Cu-based alloy, a Mg-based alloy, a Ti-based alloy, a steel, a low-carbon steel, a stainless steel), a metal-containing material (e.g., a metal nitride, a metal silicide, a metal carbide, a metal oxide), a ceramic material (e.g., carbides, nitrides, oxides, and/or borides, such as carbides and borides of at least one of W, Ti, Mo, Nb, V, Hf, Ta, Cr, Zr, Al, and silicon (Si)), and a ceramic-metal composite material. In some embodiments, the cup structure 218 is formed of and includes a metal alloy (e.g., a steel alloy).

Referring to FIG. 2, to couple (e.g., clamp, attach) the wear liner 120 to the shell 104 of the vessel 102 using the retention device 200, the inner nut structure 208 of the retention device 200 may be provided into a second opening 128 in the wear liner 120, and the shank structure 206 of the retention device 200 may be provided into a corresponding (e.g., aligned) first opening 126 in the shell 104 of the vessel 102. Before and/or after the inner nut structure 208 and the shank structure 206 are collectively provided into the aligned openings 124 (including the first opening 126 in the shell 104 and the second opening 128 in the wear liner 120 aligned therewith), the shank structure 206 and the inner nut structure 208 may be threadably coupled to one another. In some embodiments, the inner nut structure 208 is inserted into the relative to the second opening 128 in the wear liner 120 from within the vessel 102, and the shank structure 206 is inserted into the corresponding first opening 126 in the shell 104 from outside the vessel 102 and is then rotated to extend into the aperture 223 within the inner nut structure 208 and threadably engage the inner nut structure 208. In additional embodiments, the inner nut structure 208 and the shank structure 206 are threadably coupled to one another, and then the combination of the inner nut structure 208 and the shank structure 206 is inserted into the aligned openings 124 from within the vessel 102. After the inner nut structure 208 and the shank structure 206 are collectively provided into the aligned openings 124, the seal structure 216 and the cup structure 218 may be slipped over a portion (e.g., the additional threaded region 206B (FIG. 2)) of the shank structure 206 extending past the external surface 130 of the shell 104, and then outer nut structure 210 may be threadably coupled to the portion (e.g., the additional threaded region 206B (FIG. 2)) of the shank structure 206. Thereafter, the outer nut structure 210 may be rotated (e.g., with a suitable tool, such as a pneumatic wrench) to tighten the retention device 200, couple the wear liner 120 to the shell 104 of the vessel 102, and the seal (e.g., by way of the seal structure 216) the first opening 126 in the shell 104 of the vessel 102.

During the rotation of the outer nut structure 210 to couple the wear liner 120 to the shell 104 of the vessel 102, the shank structure 206 may also move (e.g., rotate) in the direction of rotation (e.g., clockwise direction) of the outer nut structure 210. As a result, the threaded region 206A (FIG. 3) of the shank structure 206 may be forced deeper (e.g., in the positive Z-direction) into the inner nut structure 208 (e.g., by the engagement of the protrusions 220 (FIG. 3) of the threaded region 206A of the shank structure 206 with the other protrusions 224 of the inner nut structure 208) while the additional threaded region 206B (FIG. 3) of the shank structure 206 may be forced deeper (e.g., in the negative Z-direction) into the outer nut structure 210 (e.g., by the engagement of the additional protrusions 222 (FIG. 3) of the additional threaded region 206B of the shank structure 206 with the further protrusions 228 of the outer nut structure 210). The shank structure 206 may continue to rotate relative to the inner nut structure 208 under torque applied to the outer nut structure 210 even after the outer nut structure 210 stops rotating relative to the shank structure 206 under torque applied to the outer nut structure 210 (and, hence, may drive the shank structure 206 even deeper into the inner nut structure 208); or the outer nut structure 210 may continue to rotate relative to the shank structure 206 under torque applied to the outer nut structure 210 even after the after the shank structure 206 stops rotating relative to the inner nut structure 208 under the applied torque on the outer nut structure 210 (and, hence, may drive the shank structure 206 even deeper into the outer nut structure 210). The resulting opposing forces on the threaded region 206A and the additional threaded region 206B of the shank structure 206 may enhance tension, tension distribution (e.g., facilitating a relatively more symmetrical distribution of tensile stress throughout the height of the shank structure 206 in the Z-direction, including tensile stress at or proximate a center of the shank structure 206 in the Z-direction) within the shank structure 206, and associated clamping force provided by the retention device 200 as compared to conventional retention device configurations (e.g., conventional bolt and nut configurations). The configuration of the retention device 200 may also permit the wear liner 120 to be coupled to the shell 104 of the vessel using relatively less powerful, lower speed torque tools (e.g., pneumatic torque wrenches) as compared to relatively more powerful, higher speed torque tools required by conventional retention device configurations (e.g., conventional bolt and nut configurations). Moreover, since the inner nut structure 208 of the retention device 200 is discrete from (e.g., is not integral and continuous with) the shank structure 206 of the retention device 200, the inner nut structure 208 may remain properly positioned (e.g., properly seated) within the second opening 128 in the wear liner 120 as the wear liner 120 is coupled to the shell 104 of the vessel 102, whereas in many conventional retention device configurations a bolt head of the conventional retention device integral with a threaded rod of the conventional retention device may undesirably shift (e.g., rotate) within a corresponding opening in a wear liner as the wear liner is coupled to a shell of a vessel.

Still referring to FIG. 2, to decouple the wear liner 120 from the shell 104 of the vessel 102, the outer nut structure 210 may be rotated in a second direction (e.g., a counter-clockwise direction) opposing the direction of rotation (e.g., the clockwise direction) employed to couple the wear liner 120 from the shell 104 of the vessel 102. In some embodiments, such as embodiments wherein the outer nut structure 210 includes the first outer nut structure 212 and the second outer nut structure 214, the rotation of the outer nut structure 210 also effectuates the rotation of the shank structure 206 in the second direction, to decouple the threaded region 206A (FIG. 3) of the shank structure 206 from the inner nut structure 208. In additional embodiments, the rotation of the outer nut structure 210 decouples the outer nut structure 210 from the additional threaded region 206B (FIG. 3) of the shank structure 206 without decoupling the threaded region 206A (FIG. 3) of the shank structure 206 from the inner nut structure 208.

As previously described above, the retention device 200 may be formed to exhibit a different configuration than that depicted in FIG. 3. By way of non-limiting example, FIGS. 4 through 8 show transverse cross-sectional views of different retention devices (e.g., different wear liner retention devices), in accordance with additional embodiments of the disclosure. Throughout the remaining description and the accompanying figures, functionally similar features (e.g., structures, regions, devices) are referred to with similar reference numerals incremented by 100. To avoid repetition, not all features shown in FIGS. 4 through 8 are described in detail herein. Rather, unless described otherwise below, a feature designated by a reference numeral that is a 100 increment of the reference numeral of a previously-described feature (whether the previously-described feature is first described before the present paragraph, or is first described after the present paragraph) will be understood to be substantially similar to the previously-described feature.

FIG. 4 illustrates a partial, transverse cross-sectional view of a retention device 300 (e.g., a wear liner retention device), in accordance with further embodiments of the disclosure.

As shown in FIG. 4, the retention device 300 is similar to the retention device 200 shown in FIG. 3, except that the shank structure 306 thereof includes at least one blind opening 330 partially vertically extending (e.g., in the Z-direction) therethrough, and, optionally, at least one sensor 332 within the blind opening 330. The retention device 300 may be used to removably couple the wear liner 120 (FIG. 2) to the shell 104 (FIG. 2) of the vessel 102 (FIG. 2) in a manner substantially similar to that previously described with respect to the retention device 200 (FIG. 3).

As depicted in FIG. 4, in some embodiments, the blind opening 330 vertically extends partially through the additional threaded region 306B of the shank structure 306. The blind opening 330 may be substantially limited to the additional threaded region 306B of the shank structure 606. For example, the blind opening 330 may vertically extend to a depth within shank structure 606 having a magnitude less than or equal to a vertical height of the outer nut structure 310 of the retention device 300. Accordingly, an entirety of the blind opening 330 may be positioned outside of the vertical boundaries of the shell 104 (FIG. 2) of the vessel 102 (FIG. 2) during use and operation of the retention device 300. In additional embodiments, the blind opening 330 may vertically extend farther into the shank structure 306, such as relatively farther into the additional threaded region 306B of the shank structure 306, to or into the unthreaded region 306C of the shank structure 306, or to or into the threaded region 306A of the shank structure 306.

The blind opening 330 may exhibit a desired horizontal cross-sectional shape including, but not limited to, a circular shape, a tetragonal shape (e.g., square, rectangular, trapezium, trapezoidal, parallelogram), a triangular shape, a semicircular shape, an ovular shape, an elliptical shape, or a combination thereof. The blind opening 330 may exhibit substantially the same horizontal dimensions (e.g., substantially the same length and width, substantially the same diameter) throughout the vertical depth (e.g., height) thereof, or the horizontal dimensions of the blind opening 330 may vary throughout the vertical depth thereof (e.g., an upper portion of the blind opening 330 may have at least one of a different length, a different width, and a different diameter than a lower portion of the blind opening 330). In addition, the blind opening 330 may be substantially horizontally centered about a central vertical axis of the shank structure 306, or may be horizontally offset from the central vertical axis of the shank structure 306. In some embodiments, the blind opening 330 is substantially horizontally centered about the central vertical axis of the shank structure 306.

With continued reference to FIG. 4, if present, the sensor 332 may be at least partially (e.g., substantially) positioned within the blind opening 330. The sensor 332 may comprise an electronic device configured and positioned to monitor the status of (e.g., changes to) one or more of component(s) of the retention device 300, component(s) of the vessel 102 (FIG. 1), and environmental condition(s) (e.g., condition(s) within and/or outside) of the vessel 102 (FIG. 1); and to communicate (e.g., transmit, relay, convey) information (e.g., data) related to the component(s) and/or the environmental condition(s) to at least one other device (e.g., the receiving device 116 (FIG. 1) of the assembly 100 (FIG. 1); another device). The sensor 332 may include at least one sensing module (e.g., a torque sensing module; a wear-detection module, such as an ultrasound-based wear-detection module; an acceleration sensing module; an audio sensing module; a temperature sensing module; a pressure sensing module; a velocity sensing module; a radiation sensing module; a moisture sensing module; a pH sensing module), and at least one output device (e.g., wireless transmitter, audio transducer, light-emitting diode). The sensor 332 may also include other structures and/or devices, such as one or more power supplies (e.g., batteries), input devices (e.g., wireless receivers), memory devices, switches, resistors, capacitors, inductors, diodes, cases.

In some embodiments, the sensing module of the sensor 332 comprises at least one torque sensing module. The torque sensing module may measure torque applied to one or more components (e.g., one or more of the outer nut structure 310, the shank structure 306, and the inner nut structure 308) of the retention device 300. By way of non-limiting example, the torque sensing module may comprise one or more of magnetoelastic device(s), strain gauge device(s), surface acoustic wave (SAW) device(s), twist angle measurement device(s), and phase shift measurement device(s) to measure torque applied to the component(s) of the retention device 300.

In additional embodiments, the sensing module of the sensor 332 comprises at least one wear detection module configured to detect wear to the retention device 300. The wear detection module may be configured to monitor a vertical thickness (e.g., in the Z-direction) and/or a volume of at least a portion (e.g., at least the shank structure 306) of the retention device 300 without the use of a probe. The wear detection module may, for example, employ at least one of sound (e.g., ultrasound) and radiation to determine the vertical thickness and/or the volume of at least the shank structure 306 of the retention device 300 without the use of a structure physically extending into the shank structure 306. By way of non-limiting example, the wear detection module may comprise an ultrasonic sensing module configured to direct an ultrasound signal (e.g., ultrasound waves) into at least a portion of the shank structure 306 to determine the vertical thickness and/or the volume of the at least a portion of the shank structure 306. In some embodiments, the ultrasonic sensing module utilizes pulse-echo monitoring to measure the vertical thickness of the shank structure 306. For example, the ultrasonic sensing module may generate an ultrasound pulse (e.g., through application of a short voltage pulse across a piezoelectric material of the ultrasonic monitoring device), direct the ultrasound pulse into the shank structure 306, and then determine a time distance of arrival (TDOA) (e.g., the amount of time until an echoed ultrasound pulse is detected by the ultrasonic sensing module). The TDOA may then be multiplied by the ultrasound velocity in the material of the shank structure 306 to determine the distance travelled by the ultrasound pulse, which may be used to determine a vertical thickness of the shank structure 306. The ultrasound pulse may continue to echo back and forth within the shank structure 306, and the TDOA between the echoes may be measured and averaged to determine an averaged value for the thickness of the shank structure 306.

The output device of the sensor 332 may comprise a device or module operatively associated with the sensing module and configured to communicate with (e.g., at least convey information to) at least one other device located outside of the boundaries of the retention device 300, such as the receiving device 116 (FIG. 1) of the assembly 100 (FIG. 1). For example, the output device may comprise one or more of a wireless transmitter, an audio transducer, and a light-emitting diode configured to relay one or more pieces of information to the at least one other device. In some embodiments, the output device comprises a wireless transmitter, such as a radio frequency identification device (RFID). The wireless transmitter may be configured and operated to receive information associated with one or more sensing modules of the sensor 332 and to transmit the information to the least one other device (e.g., the receiving device 116 (FIG. 1)), by way of a detectable wireless signal (e.g., a detectable radio frequency (RF) signal). The wireless transmitter may, for example, receive an interrogation signal (e.g., an RF signal) from the other device(s), and may output another signal (e.g., another RF signal) corresponding to the status of one or more components and/or of one or more environmental conditions of the vessel 102. The wireless transmitter (e.g., RFID) (if any) of one or more of the retention devices 300 of the assembly 100 (FIG. 1) may have a unique identification number permitting the wireless transmitter to be uniquely identified by the receiving device 116 relative to one or more other wireless transmitters (if any) of one or more other of the retention device 300 of the assembly 100 (FIG. 1).

The sensor 332, if any, may comprise an active device including an integrated power supply (e.g., a power supply included as a component of the sensor 332) to configured power one or more components of the sensor 332, may comprise a passive device configured to derive power for one or more components thereof from at least one other device separate and distinct from the sensor 332 (e.g., at least one other device outside of the boundaries of the retention device 300, such as the receiving device 116 shown in FIG. 1), or may comprise a combination thereof. In some embodiments, the sensor 332 is an active device that utilizes an integrated power supply (e.g., at least one battery) as a power source to stimulate (e.g., substantially continuously stimulate, periodically stimulate) one or more components of the sensor 332 and detect and/or transmit information on changes to the sensor 332. In additional embodiments, the sensor 332 is a passive device that utilizes an interrogation signal from the at least one other device (e.g., the receiving device 116 (FIG. 1) of the assembly 100 (FIG. 1)) as a power source to temporarily stimulate one or more components of the sensor 332 and detect and/or transmit information to the at least one other device.

The sensor 332, if any, may be configured and operated to sense and convey a single piece of information related to the use and operation of the vessel 102 (FIG. 1), or may be configured and operated to sense and convey multiple pieces of information. In addition, the sensor 332 may be substantially confined within boundaries (e.g., horizontal boundaries and/or vertical boundaries) of the blind opening 330, or may project beyond the boundaries of the blind opening 330. In some embodiments, the sensor 332 is substantially confined within the boundaries of the blind opening 330. In additional embodiments, a portion of the sensor 332 extends beyond the boundaries of the blind opening 330.

Figure 5:
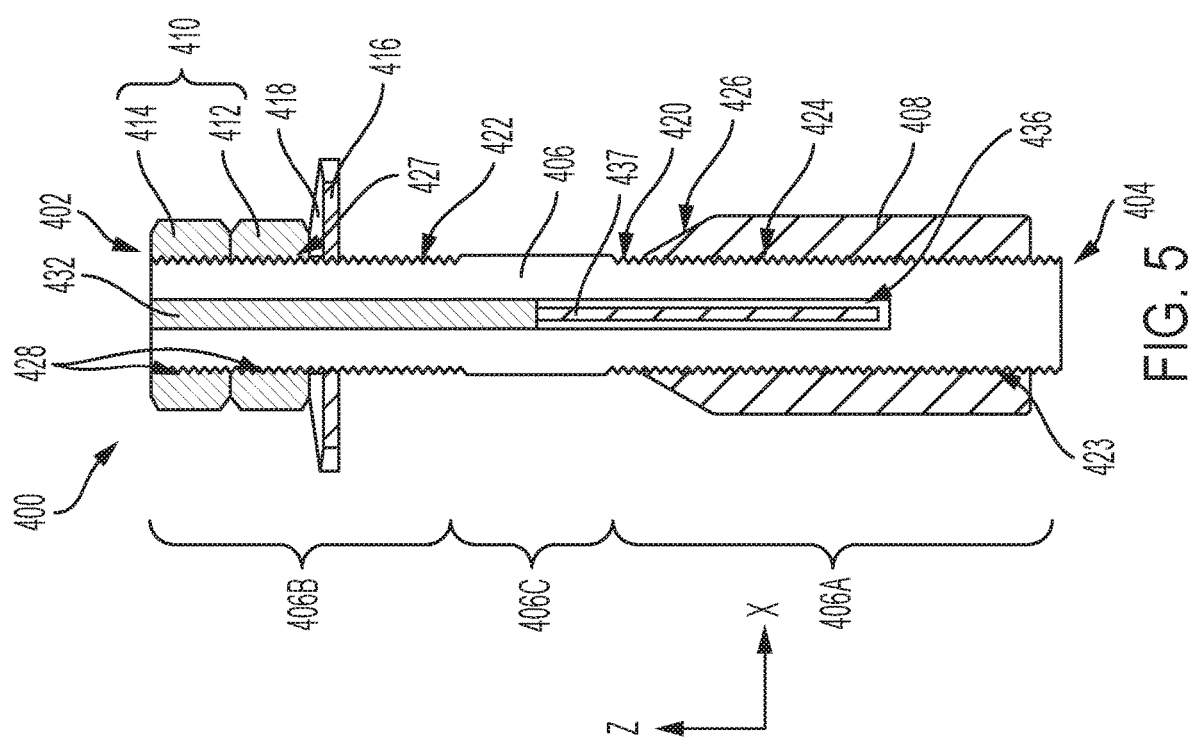
FIG. 5 is a transverse cross-sectional view of a retention device, in accordance with an additional embodiment of the disclosure.

FIG. 5 illustrates a partial, transverse cross-sectional view of a retention device 400 (e.g., a wear line retention device), in accordance with further embodiments of the disclosure. As shown in FIG. 5, the retention device 400 is similar to the retention device 300 shown in FIG. 4, except that at least one elongated blind opening 436 vertically extends (e.g., in the Z-direction) farther into the shank structure 406 relative to the blind opening 346 (FIG. 4) vertically extending into the shank structure 306 (FIG. 4); the configuration of the at least one sensor 432 (if any) within the elongated blind opening 436 may, optionally, be different than the configuration of the sensor 332 (FIG. 4); and a vertical height of the threaded region 406A of the shank structure 406 relative to a vertical height of the inner nut structure 408 may be greater than the vertical height of the threaded region 306A (FIG. 4) of the shank structure 306 (FIG. 4) relative to the vertical height of the inner nut structure 308 (FIG. 4). The retention device 400 may be used to removably couple the wear liner 120 (FIG. 2) to the shell 104 (FIG. 2) of the vessel 102 (FIG. 2) in a manner substantially similar to that previously described with respect to the retention device 200 (FIG. 3).

As depicted in FIG. 5, in some embodiments, the elongated blind opening 436 vertically extends (e.g., in the Z-direction) through each of the additional threaded region 406B and the unthreaded region 406C of the shank structure 306 and into the threaded region 406A of the shank structure 406. Accordingly, during use and operation of the retention device 400, a portion of the elongated blind opening 436 may be positioned outside of vertical boundaries of the shell 104 (FIG. 2) of the vessel 102 (FIG. 2), another portion of the elongated blind opening 436 may be positioned within the vertical boundaries of the shell 104 (FIG. 2) of the vessel 102 (FIG. 2), and a further portion of the elongated blind opening 436 may be positioned within of vertical boundaries of the wear liner 120 (FIG. 2). In additional embodiments, the elongated blind opening 436 may vertically extend to a different depth within the shank structure 406, such as relatively farther into the threaded region 406A of the shank structure 406, or relatively less far into the threaded region 406A of the shank structure 406.

As a result of the relatively increased vertical height of the elongated blind opening 436 as compared to the blind opening 330 (FIG. 3), the sensor 432 (if any) within the elongated blind opening 436 may, optionally, exhibit a different configuration than the sensor 332 (FIG. 4) of the retention device 300 (FIG. 4) in one or more aspects. For example, as shown in FIG. 5, the sensor 432 may have a relatively larger vertical height than the sensor 332 (FIG. 4). As another example, one or more of the sensing modules (e.g., torque sensing module; wear-detection module; acceleration sensing module; audio sensing module; temperature sensing module; pressure sensing module; velocity sensing module; radiation sensing module; moisture sensing module; pH sensing module) of the sensor 432 may, optionally, be operatively associated with at least one probe 437 vertically extending into the threaded region 406A of the shank structure 406. Other aspects of the sensor 432 (e.g., sensing module(s) not operative associated with the probe(s) 437; output device(s), power source(s), position and confinement characteristics) may be substantially similar to the sensor 332 (FIG. 4) of the retention device 300 (FIG. 4). In additional embodiments, a configuration of the sensor 432 (including configurations of the sensing module(s) and output device(s) thereof) is substantially the same as the configuration of the sensor 332 (FIG. 4) of the retention device 300 (FIG. 4).

The probe 437, if any, may be configured to identify (e.g., signal, communicate) a change in at least one of a geometric configuration (e.g., size, shape) of the elongated blind opening 436, and the environmental conditions (e.g., material composition, pressure, pH, temperature) present within the elongated blind opening 436. The probe 437 may, for example, exhibit a size, shape, material composition, and position within the elongated blind opening 436 facilitating detection of a reduction in a size (e.g., depth, height) of the elongated blind opening 436. As a non-limiting example, the probe 437 may comprise at least one structure (e.g., a coil, a wire, a rod, a cylinder) formed of and including a variable resistance material and/or a variable capacitance material. Changes to the resistance and/or the capacitance of the structure resulting from wear to the structure may be detected by a sensing module of the sensor 432 to indicate a wear level of the retention device 400 (and, hence, the wear liner 120 (FIG. 2)). As another non-limiting example, the probe 437 may comprise at least one structure exhibiting multiple sections (e.g., portions) each independently including an electrical circuit loop (e.g., an open electrical circuit loop, or a closed electrical circuit loop). Modification (e.g., closing or opening) of the electrical circuit loop of one or more of the section(s) of the structure(s) due to wear to the structure may be detected by a sensing module of the sensor 432 to indicate the wear level of the retention device 400 (and, hence, the wear liner 120 (FIG. 2)). As an additional non-limiting example, the probe 437 may comprise a wick configured and positioned to transport conductive liquid (e.g., water) to the sensing module. The sensing module may have an open electrical circuit under the initial geometric configuration of the elongated blind opening 436, and may form a closed electrical circuit after a conductive liquid is provided (e.g., wicked, transported) thereto by the probe 437 upon modification of the elongated blind opening 436 during use and operation of the vessel 102 (FIG. 1). As a further non-limiting example, the probe 437 may comprise a sealed, at least partially hollow structure formed of and including one or more of a flexible material (e.g., metal foil, plastic, rubber) and a brittle material (e.g., a ceramic material, silicon, glass, sapphire, quartz). The sealed, at least partially hollow structure of the probe 437 may deform (e.g., warp, bend), rupture (e.g., break), and/or degrade (e.g., wear away) upon modification of the elongated blind opening 436 during use and operation of the vessel 102 (FIG. I) to modify the internal pressure of the probe 437.

With continued reference to FIG. 5, optionally, the vertical height of the threaded region 406A of the shank structure 406 of the retention device 400 relative to the vertical height of the inner nut structure 408 of the retention device 400 may be greater than the vertical height of the threaded region 306A (FIG. 3) of the shank structure 306 (FIG. 3) of the retention device 300 (FIG. 3) relative to the vertical height of the inner nut structure 308 (FIG. 3) of the retention device 300 (FIG. 3). For example, as shown in FIG. 5, the threaded region 406A of the shank structure 406 and the inner nut structure 408 may be vertically sized such that a lower vertical surface of the threaded region 406A of the shank structure 406 vertically extends past a lower vertical surface of the inner nut structure 408 during use and operation of the retention device 400. Accordingly, the second vertical end 404 of the retention device 400 may be substantially non-planar during use and operation of the retention device 400. In additional embodiments, the threaded region 406A of the shank structure 406 and the inner nut structure 408 are vertically sized such that the second vertical end 404 of the retention device 400 is substantially planar during use and operation of the retention device 400.

Figure 6:
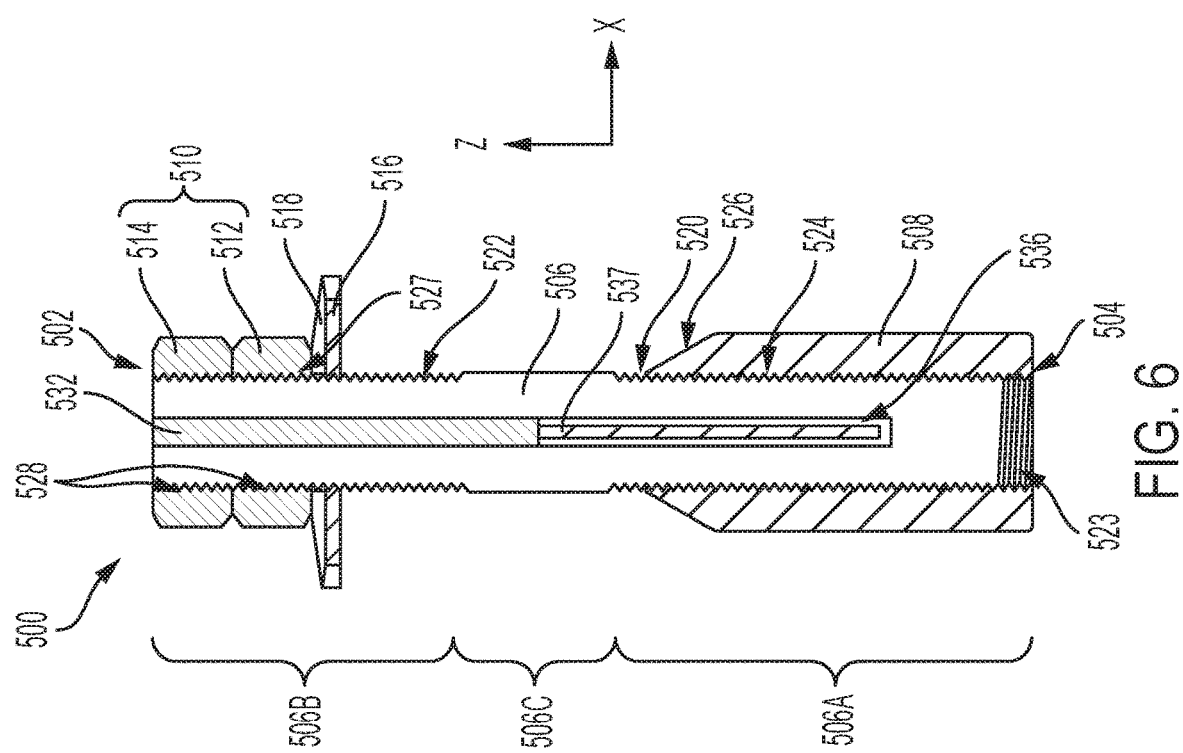
FIG. 6 is a transverse cross-sectional view of a retention device, in accordance with a further embodiment of the disclosure.

FIG. 6 illustrates a partial, transverse cross-sectional view of a retention device 500 (e.g., a wear line retention device), in accordance with further embodiments of the disclosure. As shown in FIG. 6, the retention device 500 is similar to the retention device 400 shown in FIG. 5, except that a vertical height of the threaded region 506A of the shank structure 506 relative to a vertical height of the inner nut structure 508 may be less than the vertical height of the threaded region 406A (FIG. 5) of the shank structure 406 (FIG. 5) relative to the vertical height of the inner nut structure 408 (FIG. 5). For example, the threaded region 506A of the shank structure 506 and the inner nut structure 508 of the retention device 500 may individually be vertically sized such that a lower vertical surface of the threaded region 506A of the shank structure 506 is vertically recessed relative to a lower vertical surface of the inner nut structure 508 during use and operation of the retention device 500. Accordingly, the second vertical end 504 of the retention device 500 may be substantially non-planar during use and operation of the retention device 500. The retention device 500 may be used to removably couple the wear liner 120 (FIG. 2) to the shell 104 (FIG. 2) of the vessel 102 (FIG. 2) in a manner substantially similar to that previously described with respect to the retention device 200 (FIG. 3).

Figure 7:
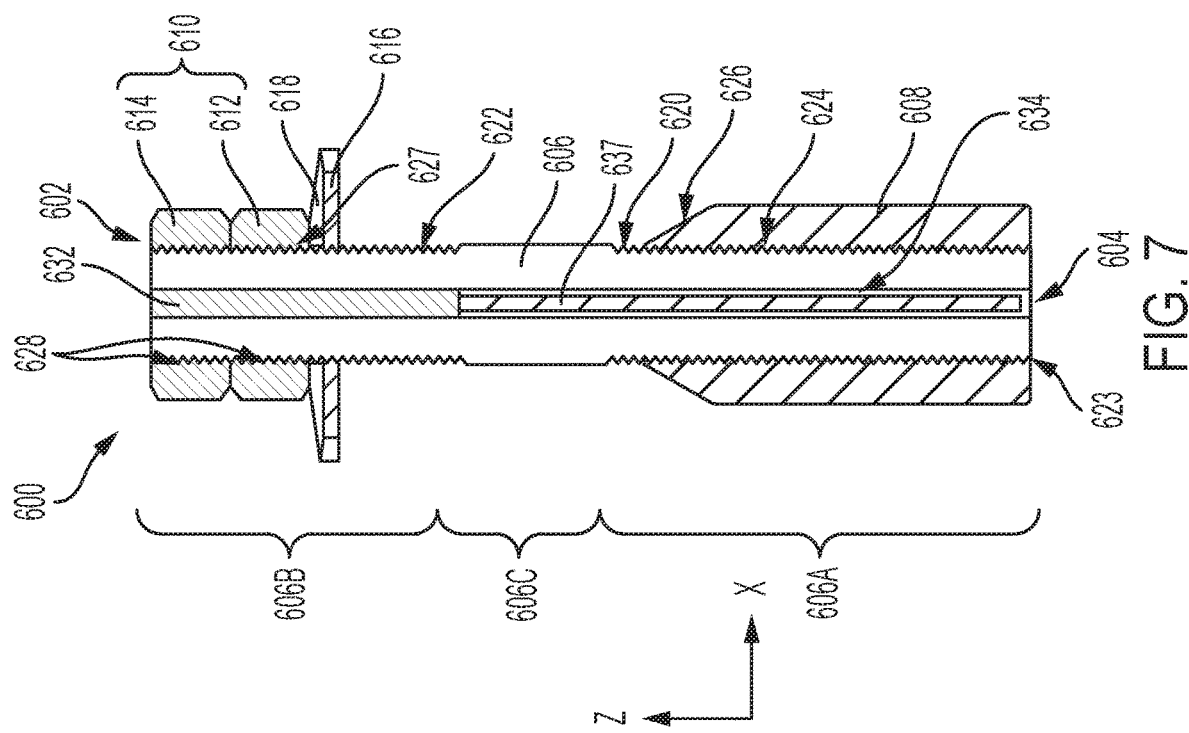
FIG. 7 is a transverse cross-sectional view of a retention device, in accordance with a further embodiment of the disclosure.

FIG. 7 illustrates a partial, transverse cross-sectional view of a retention device 600 (e.g., a wear line retention device), in accordance with further embodiments of the disclosure. As shown in FIG. 7, the retention device 600 is similar to the retention device 400 shown in FIG. 5, except that at least one through opening 634 vertically extends (e.g., in the Z-direction) completely through the shank structure 606; the configuration of the at least one sensor 632 (if any) within the through opening 634 may, optionally, be different than the configuration of the sensor 432 (FIG. 5); and a vertical height of the threaded region 606A of the shank structure 606 relative to a vertical height of the inner nut structure 608 may be different than (e.g., less than) the vertical height of the threaded region 406A (FIG. 5) of the shank structure 406 (FIG. 5) relative to the vertical height of the inner nut structure 408 (FIG. 5). The retention device 600 may be used to removably couple the wear liner 120 (FIG. 2) to the shell 104 (FIG. 2) of the vessel 102 (FIG. 2) in a manner substantially similar to that previously described with respect to the retention device 200 (FIG. 3).

As depicted in FIG. 7, the through opening 634 may continuously vertically extend (e.g., in the Z-direction) from an uppermost vertical boundary (e.g., an uppermost surface) of the shank structure 606 to a lowermost vertical boundary (e.g., a lowermost surface) of the shank structure 606. Accordingly, during use and operation of the retention device 600, a portion of the through opening 634 may be positioned outside of vertical boundaries of the shell 104 (FIG. 2) of the vessel 102 (FIG. 2), another portion of the through opening 634 may be positioned within the vertical boundaries of the shell 104 (FIG. 2) of the vessel 102 (FIG. 2), and a further portion of the through opening 634 may be positioned within of vertical boundaries of the wear liner 120 (FIG. 2). The through opening 634 may exhibit any desired horizontal cross-sectional shape including, but not limited to, a circular shape, a tetragonal shape (e.g., square, rectangular, trapezium, trapezoidal, parallelogram), a triangular shape, a semicircular shape, an ovular shape, an elliptical shape, or a combination thereof The through opening 634 may exhibit substantially the same horizontal dimensions (e.g., the same length and width, the same diameter) through-out the vertical dimension thereof, or the horizontal dimensions of the through opening 634 may vary through-out the vertical dimension thereof (e.g., an upper portion of the through opening 634 may have at least one of a different length, a different width, and a different diameter than a lower portion of the through opening 634). In addition, the through opening 634 may be substantially horizontally centered about a central vertical axis of the shank structure 606, or may be horizontally offset from the central vertical axis of the shank structure 606. In some embodiments, the through opening 634 is substantially horizontally centered about the central vertical axis of the shank structure 606.

The sensor 632 may be at least partially (e.g., substantially) positioned within the through opening 634. Optionally, the sensor 632 may have a relatively smaller vertical height than the sensor 432 (FIG. 5) of the retention device 400 (FIG. 5). Other aspects of the sensor 632 (e.g., sensing module(s); probe(s) 637; output device(s), power source(s), position and confinement characteristics) may be substantially similar to the sensor 432 (FIG. 5) of the retention device 400 (FIG. 5). In additional embodiments, a configuration of the sensor 632 (including configurations of the sensing module(s) and output device(s) thereof) is substantially the same as the configuration of the sensor 432 (FIG. 5) of the retention device 400 (FIG. 5). A portion of the through opening 634 not occupied by the sensor 632 may be at least partially (e.g., substantially) filled with another material, such as a self-hardening compound (e.g., an epoxy resin, such as a non-conductive epoxy resin).

With continued reference to FIG. 7, optionally, the vertical height of the threaded region 606A of the shank structure 606 of the retention device 600 relative to the vertical height of the inner nut structure 608 of the retention device 600 may be less than the vertical height of the threaded region 406A (FIG. 5) of the shank structure 406 (FIG. 5) of the retention device 400 (FIG. 5) relative to the vertical height of the inner nut structure 408 (FIG. 5) of the retention device 400 (FIG. 5). For example, as shown in FIG. 7, the threaded region 606A of the shank structure 606 and the inner nut structure 608 may be vertically sized such that a lower vertical surface of the threaded region 606A of the shank structure 606 is substantially coplanar with a lower vertical surface of the inner nut structure 608 during use and operation of the retention device 600. Accordingly, the second vertical end 604 of the retention device 600 may be substantially planar during use and operation of the retention device 600. In additional embodiments, the threaded region 606A of the shank structure 606 and the inner nut structure 408 are vertically sized such that the second vertical end 604 of the retention device 400 is substantially non-planar during use and operation of the retention device 600. For example, the lower vertical surface of the threaded region 606A of the shank structure 606 may be recessed relative to the lower vertical surface of the inner nut structure 608 during use and operation of the retention device 600, or the lower vertical surface of the threaded region 606A of the shank structure 606 may vertically extend past the lower vertical surface of the inner nut structure 608 during use and operation of the retention device 600.

Figure 8:
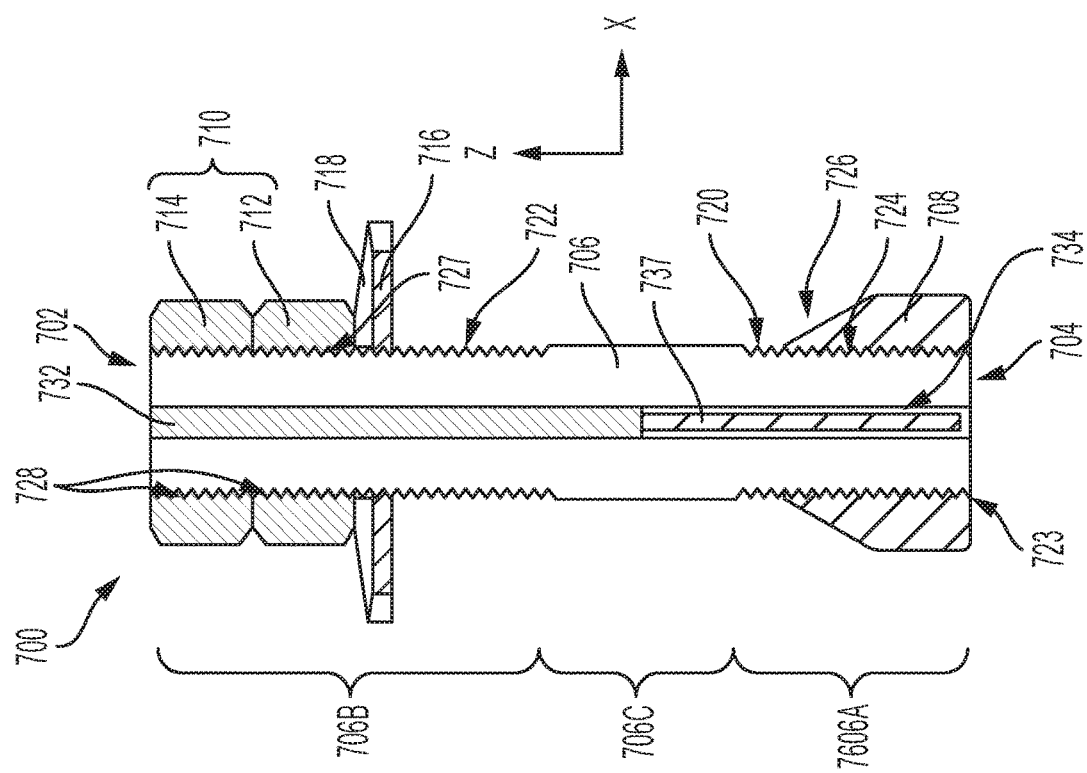
FIG. 8 is a transverse cross-sectional view of a retention device, in accordance with a further embodiment of the disclosure.

FIG. 8 illustrates a partial, transverse cross-sectional view of a retention device 700 (e.g., a wear line retention device), in accordance with further embodiments of the disclosure. As shown in FIG. 8, the retention device 700 is similar to the retention device 600 shown in FIG. 7, except that vertical heights of the threaded region 706A of the shank structure 706 and the inner nut structure 708 may less than the vertical heights of the threaded region 606A (FIG. 7) of the shank structure 606 (FIG. 7) and the inner nut structure 608 (FIG. 7). As shown in FIG. 8, the vertical heights of the threaded region 706A of the shank structure 706 and the inner nut structure 708 may be less than the vertical heights of the additional threaded region 706B of the shank structure 706. In additional embodiments, one or more of the vertical height of the threaded region 706A of the shank structure 706 and the vertical height of the inner nut structure 708 may be different than (e.g., less than, greater than) that depicted in FIG. 8, The retention device 700 may be used to removably couple the wear liner 120 (FIG. 2) to the shell 104 (FIG. 2) of the vessel 102 (FIG. 2) in a manner substantially similar to that previously described with respect to the retention device 200 (FIG. 3).

Referring again to FIG. 1, the vessel 102 may exhibit any desired distribution of the retention devices 200 (and/or of one or more of the retention devices 300, 400, 500, 600, 700 described with reference to FIGS. 4 through 8, any of which may be substituted for any or all of the retention devices 200 shown in FIGS. 1 and 2). Each of the retention devices 200 (and/or each of one or more of the retention devices 300, 400, 500, 600, 700) may be substantially the same and may be uniformly (e.g., regularly, evenly) spaced relative to the other retention devices 200 (and/or the other retention devices 300, 400, 500, 600, 700), or at least one of the retention devices 200 (and/or at least one of the retention devices 300, 400, 500, 600, 700) may be different than at least one other of the retention devices 200 (and/or at least one other of the retention devices 300, 400, 500, 600, 700) and/or may be non-uniformly (e.g., non-regularly, non-evenly) spaced relative to the other retention devices 200 (and/or the other retention devices 300, 400, 500, 600, 700). As a non-limiting example, the vessel 102 may exhibit two or more retention devices (e.g., two or more of the retention devices 200, 300, 400, 500, 600, 700) exhibiting different configurations (e.g., different geometric configurations, such as different threading configurations; different component configuration, such as different sensor configurations) than one another. In some embodiments, the retention devices 200 (and/or the retention devices 300, 400, 500, 600, 700) are selected and spaced at least partially based on analysis of historical wear patterns and/or other information for the vessel 102.

If present, the receiving device 116 may comprise any device positioned and configured to detect (e.g., sense) and receive the output (e.g., wireless transmission, sound, light) from one or more of the retention devices 300, 400, 500, 600, 700 described in relation to FIGS. 4 through 8, any of which may be substituted for any or all of the retention devices 200 shown FIGS. 1 and 2. The receiving device 116 may be selected and positioned at least partially based on the configuration of the retention devices 300, 400, 500, 600, 700 (FIGS. 4 through 8). For example, if the output device of one or more of the sensors 332, 432, 532. 632, 732 (FIGS. 4 through 8) of one or more of the retention devices 300, 400, 500, 600, 700 comprises at least one wireless transmitter, the receiving device 116 may comprise a wireless receiver positioned and configured to detect and receive wireless communications from the wireless transmitter. As another example, if the output device of one or more of the sensors 332, 432, 532, 632, 732 of one or more of the retention devices 300, 400, 500, 600, 700 comprises at least one audio transducer, the receiving device 116 may comprise an audio sensor positioned and configured to detect sound at one or more frequencies emitted by the audio transducer, which one or more frequencies may be selected to avoid ambient noise experienced during processing operations. As an additional example, if the output device of one or more of the sensors 332, 432, 532, 632, 732 of one or more of the retention devices 300, 400, 500, 600, 700 comprises at least one LED, the receiving device 116 may comprise a light sensor positioned and configured to detect radiation (e.g., light) emitted by the LED. The receiving device 116 may have any geometric configuration (e.g., size, shape) permitting the receiving device 116 to detect output from one or more of the retention devices 300, 400, 500, 600, 700 individually and/or collectively. The receiving device 116 may communicate with one or more of the other devices 116 (e.g., computers), where the information conveyed to the receiving device 116 may be analyzed and acted upon. Optionally, the receiving device 116 may also be configured and operated to output information to one or more of retention devices 300, 400, 500, 600, 700. For example, if the sensors 332, 432, 532, 632, 732 of one or more of the retention devices 300, 400, 500, 600, 700 includes at least one receiving device, the receiving device 116 may be configured and operated to relay information to the receiving device (e.g., to activate at least one specific sensor 332, 432, 532, 632, 732 and/or at least one specific sensing module present in the one or more retention devices 300, 400, 500, 600, 700).

The devices, assemblies, and methods of the disclosure provide enhanced efficiency, reduced costs, and improved safety as compared to the devices, assemblies, and methods conventionally associated with processing (e.g., grinding, pulverizing, crushing) a mined material (e.g., ore). For example, retention devices of the disclosure (e.g., the retention devices 200, 300, 400, 500, 600, 700 of FIGS. 3 through 8) facilitate the simple and cost-effective retention of wear liners (e.g., the wear liner 120 of FIG. 2) to a shell (e.g., the shell 104 of FIGS. 1 and 2) of a vessel (e.g., vessel 102 of FIGS. 1 and 2), and are also easy to produce, to handle, to place, and to secure to components (e.g., the shell 104 of the vessel 102, the wear liner 120) of an assembly (e.g., the assembly 100 of FIG. 1). In addition, the retention devices of the disclosure may be configured and operated to provide other useful information (e.g., applied torque, wear to the wear liner, the rotational velocity of the vessel, the movement of materials within the vessel) associated with use and operation of the assembly, removing uncertainties as to the reliability and durability of components of the assembly during processing of a mined material and greatly reducing costs (e.g., down time costs, labor costs, damaged equipment costs) relative to conventional retention devices. Furthermore, the configurations and locations of the retention devices of the disclosure may be tailored to particular needs and/or historical data associated with the assembly.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents. For example, elements and features described in relation to one embodiment of the disclosure may be combined with elements and features described in relation to other embodiments of the disclosure.

What is claimed is:

1. An assembly comprising a wear liner and a wear liner retention device, the wear liner retention device comprising:
   a shank structure comprising:
      a threaded region;
      an additional threaded region;
      an unthreaded region intervening between the threaded region and the additional threaded region; and
      at least one opening extending completely through the threaded region and the unthreaded region and at least partially through the additional threaded region;
   a nut structure configured to threadably couple to the threaded region of the shank structure, the nut structure having a threaded opening extending completely therethrough; and
   an additional nut structure configured to threadably couple to the additional threaded region of the shank structure and to fit within an opening extending through the wear liner, the additional nut structure having an additional threaded opening extending completely therethrough.

2. The assembly of claim 1, wherein the wear liner retention device further comprises:
   a seal structure configured to surround a portion of the additional threaded region of the shank structure; and
   a cup structure configured to contain the seal structure within a recess therein and to surround another portion of the additional threaded region of the shank structure.

3. The assembly of claim 1, wherein a height of the nut structure is greater than a height of the additional nut structure.

4. The assembly of claim 1, wherein the at least one opening extends only partially through the additional threaded region of the wear liner retention device.

5. The assembly of claim 1, wherein the at least one opening extends completely through the additional threaded region of the wear liner retention device.

6. The assembly of claim 1, further comprising at least one sensor positioned within the at least one opening, the at least one sensor comprising:
   at least one sensing module; and
   at least one output device.

7. The assembly of claim 6, wherein the at least one sensing module of the wear liner retention device comprises one or more of a torque sensing module, wear detection module, a pressure sensing module, a temperature sensing module, an audio sensing module, a velocity sensing module, an acceleration sensing module, a radiation sensing module, a moisture sensing module, and a pH sensing module.

8. The assembly of claim 6, wherein the at least one sensing module of the wear liner retention device is configured to monitor one or more of a thickness and a volume of the shank structure without use of a probe physically extending into the shank structure.

9. The assembly of claim 6, wherein the wear liner retention device further comprising at least one probe physically extending into the at least one opening and operatively associated with the at least one sensing module.

10. The assembly of claim 6, wherein the at least one output device of the wear liner retention device comprises a radio frequency identification device.

11. The assembly of claim 6, wherein the at least one sensor of the wear liner retention device is substantially confined within boundaries of the at least one opening.

12. An assembly, comprising:
   a vessel comprising a shell;
   a wear liner covering an internal surface of the shell of the vessel; and
   at least one retention device extending through and coupling the shell of the vessel and the wear liner, the at least one retention device comprising:
      a shank structure comprising:
         a threaded region extending into an opening in the wear liner;
         an additional threaded region extending into another opening in the shell aligned with the opening in the wear liner; and
         an opening extending completely through the threaded region and at least partially through the additional threaded region;
      an inner nut structure within the opening in the wear liner and threadably coupled to the threaded region of the shank structure along a threaded opening extending completely through the inner nut structure; and an outer nut structure overlying an exterior surface of the shell of the vessel and threadably coupled to the additional threaded region of the shank structure.

13. The assembly of claim 12, wherein the at least one retention device further comprises:
   a cup structure between the outer nut structure and the exterior surface of the shell of the vessel; and
   a seal structure within a recess in the cup structure and between the cup structure and the exterior surface of the shell of the vessel.

14. The assembly of claim 12, wherein the shank structure further comprises an unthreaded region between the threaded region and the additional threaded region.

15. The assembly of claim 12, further comprising a sensor within the opening.

16. The assembly of claim 12, wherein the opening comprises a blind opening only extending partially through the additional threaded region.

\* \* \* \* \*

UNITED STATES PATENT AND TRADEMARK OFFICE
CERTIFICATE OF CORRECTION

PATENT NO. : 11,697,121 B2
APPLICATION NO. : 16/562088
DATED : July 11, 2023
INVENTOR(S) : Daniel J. Steed, Shiloh D. Poulsen and Jeremy Fairbourne It is certified that error appears in the above-identified patent and that said Letters Patent is hereby corrected as shown below:

In the Specification

| | | |
|---|---|---|
| Column 8, | Line 66, | change "device **200** and the" to --device **200**, and the-- |
| Column 21, | Line 27, | change "(FIG. I)" to --(FIG. **1**)-- |
| Column 23, | Line 61, | change "in FIG. **8**, The" to --in FIG. **8**. The-- |
| Column 24, | Line 38, | change "**432, 532. 632**," to --**432, 532, 632**,-- |

Signed and Sealed this
Thirtieth Day of January, 2024

Katherine Kelly Vidal
*Director of the United States Patent and Trademark Office*